(12) United States Patent
Ochiishi

(10) Patent No.: US 11,338,452 B2
(45) Date of Patent: May 24, 2022

(54) ROBOT HAND INCLUDING A PLURALITY OF GRIPPERS AND A METHOD OF HANDLING A WIRE HARNESS USING A ROBOT HAND

(71) Applicant: FANUC CORPORATION, Yamanashi (JP)

(72) Inventor: Yoshinori Ochiishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 535 days.

(21) Appl. No.: 16/391,953

(22) Filed: Apr. 23, 2019

(65) Prior Publication Data

US 2019/0329425 A1 Oct. 31, 2019

(30) Foreign Application Priority Data

Apr. 27, 2018 (JP) .............................. JP2018-087574

(51) Int. Cl.
*B25J 9/16* (2006.01)
*B25J 15/10* (2006.01)

(52) U.S. Cl.
CPC ............. *B25J 15/10* (2013.01); *B25J 9/1664* (2013.01); *B25J 9/1697* (2013.01)

(58) Field of Classification Search
CPC ........ B25J 15/10; B25J 9/1664; B25J 9/1697; B25J 19/021; B25J 15/0057; B25J 9/046;
(Continued)

(56) References Cited

U.S. PATENT DOCUMENTS 11,141,865 B1 * 10/2021 Fujitake ............... B25J 15/0028
11,213,954 B2 * 1/2022 Tsukui ............... G05B 19/4183
(Continued)

FOREIGN PATENT DOCUMENTS

JP S60242920 A 12/1985
JP S62013100 A 1/1987
(Continued)

OTHER PUBLICATIONS

English Abstract and Machine Translation for Japanese Publication No. JP S60-242920 A, published Dec. 2, 1985, 8 pgs.
(Continued)

*Primary Examiner* — Robert T Nguyen
(74) *Attorney, Agent, or Firm* — Fredrikson & Byron, P.A.

(57) ABSTRACT

A method of handling a wire harness that can automate a task of picking up and transporting the wire harness including a plurality of connectors and a wire member by gripping the plurality of connectors. In the method, positions of the plurality of connectors of the wire harness being placed apart from the robot hand are acquired, the robot hand is positioned such that the first connector is in the range of the first gripper based on the acquired position of the first connector, the first gripper is moved and the first connector is gripped and picked up by the first gripper, then, the robot hand is positioned such that the second connector is in the motion range of the second gripper based on the acquired position of the second connector, and the second gripper is moved and the second connector is gripped and picked up by the second gripper.

5 Claims, 27 Drawing Sheets

(58) Field of Classification Search
CPC ........ B25J 13/087; B25J 13/088; B25J 15/02; B25J 15/0052; H01R 43/26; G05B 2219/40543
See application file for complete search history.

(56) References Cited

U.S. PATENT DOCUMENTS

| | | | |
|---|---|---|---|
| 2017/0327167 | A1 | 11/2017 | Herrmann et al. |
| 2019/0160673 | A1* | 5/2019 | Hirata .................... B25J 9/0087 |
| 2020/0276712 | A1* | 9/2020 | Masukawa ........... B25J 15/0253 |
| 2020/0276715 | A1* | 9/2020 | Masukawa ............. B25J 9/0087 |
| 2020/0353583 | A1* | 11/2020 | Tsukui ................ B23Q 17/2471 |
| 2020/0368923 | A1* | 11/2020 | Tsukui ................. B25J 15/0206 |

FOREIGN PATENT DOCUMENTS

| | | |
|---|---|---|
| JP | H03126102 A | 5/1991 |
| JP | H05138567 A | 6/1993 |
| JP | H05200638 A | 8/1993 |
| JP | H06126677 A | 5/1994 |
| JP | H07223179 A | 8/1995 |
| JP | 2009006460 A | 1/2009 |
| JP | 2013154448 A | 8/2013 |
| JP | 2013167572 A | 8/2013 |
| JP | 2015213979 A | 12/2015 |
| JP | 2016215313 A | 12/2016 |
| JP | 2017047994 A | 3/2017 |
| JP | 2017226062 A | 12/2017 |
| WO | 2015011823 A1 | 1/2015 |

OTHER PUBLICATIONS

English Machine Translation for Japanese Publication No. JP S62-013100 A, published Jan. 21, 1987, 6 pgs.
English Abstract and Machine Translation for Japanese Publication No. JP H03-126102 A, published May 29, 1991, 15 pgs.
English Abstract and Machine Translation for Japanese Publication No. JP H05-138567 A, published Jun. 1, 1993, 19 pgs.
English Abstract and Machine Translation for Japanese Publication No. JP H05-200638 A, published Aug. 10, 1993, 39 pgs.
English Abstract and Machine Translation for Japanese Publication No. JP H06-126677 A, published May 10, 1994, 51 pgs.
English Abstract and Machine Translation for Japanese Publication No. JP H07-223179 A, published Aug. 22, 1995, 17 pgs.
English Abstract and Machine Translation for Japanese Publication No. JP 2009-006460 A, published Jan. 15, 2009, 23 pgs.
English Abstract and Machine Translation for Japanese Publication No. JP 2013-154448 A, published Aug. 15, 2013, 38 pgs.
English Abstract and Machine Translation for Japanese Publication No. JP 2013-167572 A, published Aug. 29, 2013, 33 pgs.
English Abstract and Machine Translation for International Publication No. WO 2015/011823 A1, published Jan. 29, 2015, 7 pgs.
English Abstract and Machine Translation for Japanese Publication No. JP 2015-213979 A, publishedDec. 3, 2015, 39 pgs.
English Abstract and Machine Translation for Japanese Publication No. JP 2016-215313 A, published Dec. 22, 2016, 41 pgs.
English Abstract and Machine Translation for Japanese Publication No. JP 2017-047994 A, published Mar. 9, 2017, 38 pgs.
English Abstract and Machine Translation for Japanese Publication No. 2017-226062 A, published Dec. 28, 2017, 16 pgs.

* cited by examiner

ROBOT HAND INCLUDING A PLURALITY OF GRIPPERS AND A METHOD OF HANDLING A WIRE HARNESS USING A ROBOT HAND

BACKGROUND OF THE INVENTION

1. Field of the Invention

The invention relates to a robot hand including a plurality of grips and a method for handling a wire harness using a robot hand.

2. Description of the Related Art

A device for holding and transporting a wire harness using a robot hand is known (Japanese Unexamined Patent Publication (Kokai) No. 2017-226062).

Some wire harnesses have a plurality of connectors and a wire member interconnecting the connectors, and automating a task of picking up and transporting the wire harness by gripping a plurality of connectors is desired.

SUMMARY OF INVENTION

In an aspect of the present disclosure, a method of handling a wire harness including a plurality of connectors and a wire member, using a robot hand including a plurality of grips configured to move independently from each other, including acquiring positions of the plurality of connectors of the wire harness arranged apart from the robot hand; based on the acquired position of a first connector of the plurality of connectors, positioning the robot hand such that a first connector of the plurality of connectors is within a motion range of a first gripper of the plurality of grippers, moving the first gripper and gripping and picking up the first connector by the first gripper; and based on the acquired position of a second connector of the plurality of connectors, positioning the robot hand such that the second connector is within a motion range of a second gripper of the plurality of grippers, moving the second gripper and gripping and picking up the second connector by the second gripper.

In another aspect of the present disclosure, a robot hand includes a first base; a plurality of grippers supported by the first base so as to be movable independently from each other, and configured to grip an object; a plurality of force transmission members respectively connected to the plurality of grippers, and transmit driving force for moving each gripper to the respective grippers; one gripper driving section supported by the first base so as to be movable relative to the plurality of force transmission members, the gripper driving section being configured to engage one force transmission member selected from the plurality of force transmission members by moving relative to the plurality of force transmission members, and apply the driving force to the engaged one force transmission member so as to move the gripper connected to the one force transmission member; and a movement mechanism configured to move the gripper driving section and the plurality of force transmission members relative to each other such that the gripper driving section engages the one force transmission member.

According to the method for handling a wire harness of the present disclosure, a task of transporting a wire harness including a plurality of connectors can be automated. With the robot hand according to the present disclosure, weight of the robot hand can be reduced, and a manufacturing cost can be lowered because a plurality of actuators for actuating a plurality of grips do not have to be arranged.

DETAILED DESCRIPTION

Figure 1:
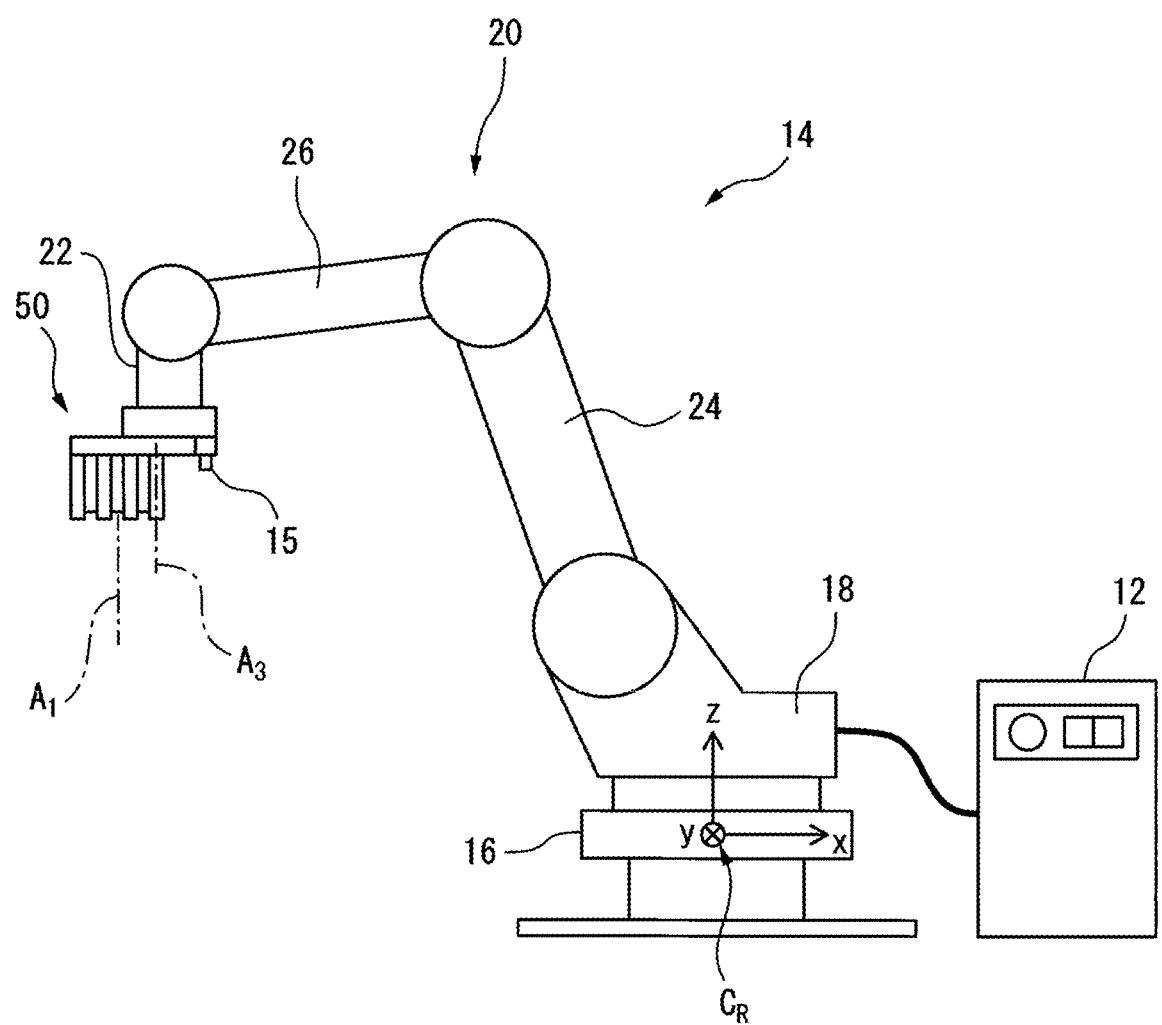
FIG. 1 is a robot system according to an embodiment.

Hereinafter, with reference to the figures, embodiments of the present disclosure are described in detail. In the various embodiments described hereafter, similar elements are assigned the same reference numerals, and the repetitive descriptions thereof will be omitted. In addition, in the following description, the upward direction and downward direction in the drawing are referred to as upward direction and downward direction, respectively, for the sake of convenience.

Figure 2:
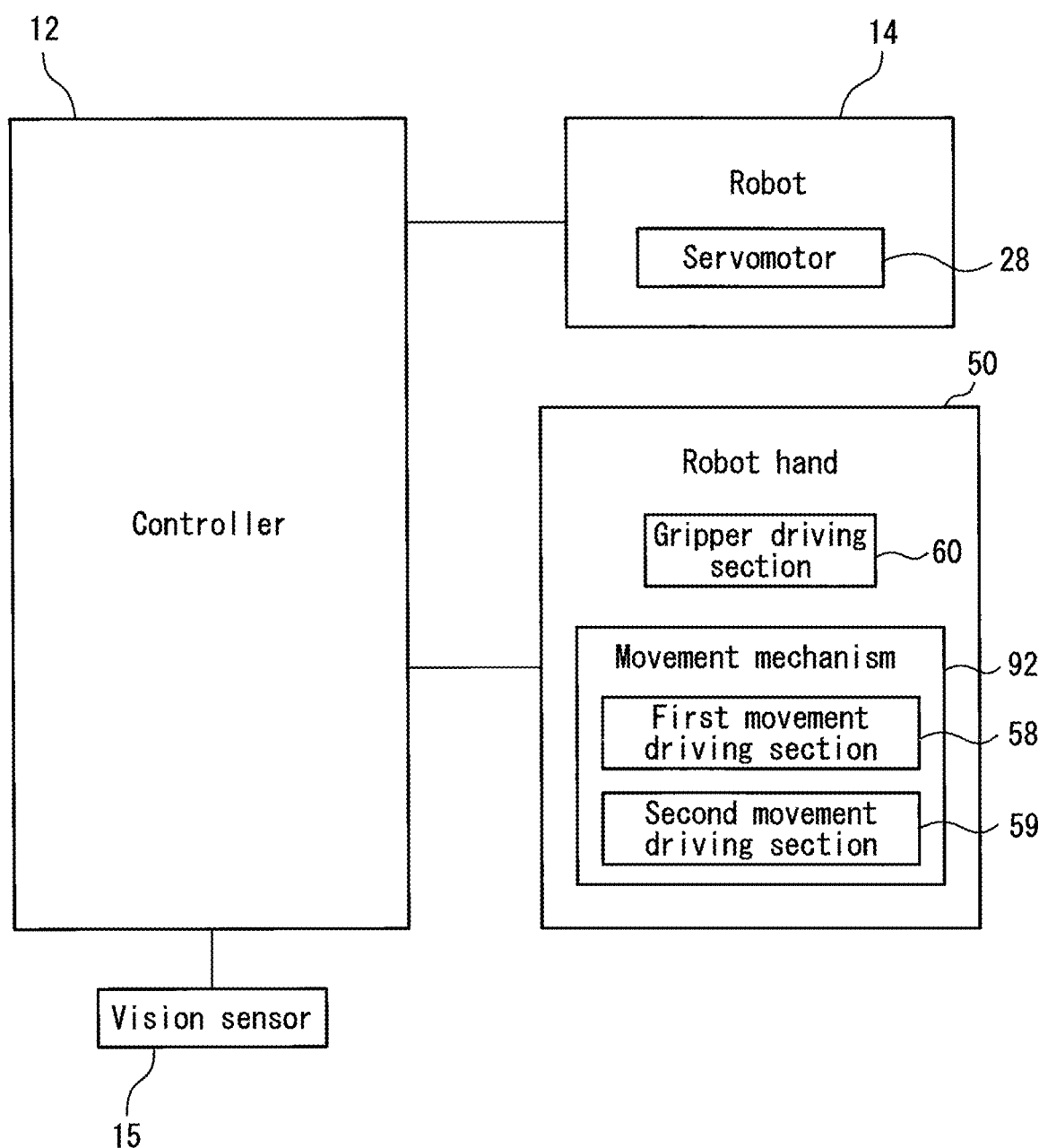
FIG. 2 is a block drawing of the robot system illustrated in FIG. 1.

With reference to FIGS. 1 and 2, a robot system 10 according to an embodiment will be described. The robot system 10 includes a controller 12, a robot 14, a vision sensor 15, and a robot hand 50. The controller 12 includes e.g. a processor (CPU, GPU, etc.) and a memory (ROM, RAM, etc.), and controls the robot 14, the vision sensor 15, and the robot hand 50.

In this embodiment, the robot 14 is a vertical-articulated robot, and includes a base 16, a revolving body 18, a robot arm 20, and a wrist 22. The base 16 is fixed to a floor of a work cell. The revolving body 18 is provided at the base 16 so as to be rotatable about a vertical axis.

The robot arm 20 includes a lower arm 24 rotatably provided at the revolving body 18 and an upper arm 26 rotatably provided at a distal end of the lower arm 24. The wrist 22 is provided at a distal end of the upper arm 26, and supports the robot hand 50 in a rotatable manner.

The robot 14 includes a plurality of servomotors 28 (FIG. 2) therein. The servomotors 28 are built in the base 16, the revolving body 18, the robot arm 20, and the wrist 22, respectively, and drive the revolving body 18, the robot arm 20, and the wrist 22 in response to a command from the controller 12.

The vision sensor 15 is e.g. a 3D vision sensor, and includes an imaging sensor such as a CCD or a CMOS, an optical lens such as a focus lens, and an image processor, etc. In this embodiment, the vision sensor 15 is mounted at the robot hand 50, and moved by the robot 14. The vision sensor 15 images an object in response to a command from the controller 12, and detects a position and orientation of the object.

A robot coordinate system $C_R$ is set for the robot 14. In this embodiment, the robot coordinate system $C_R$ is set such that the origin thereof is arranged at the center of the base 16, and the z-axis thereof is parallel to the vertical direction. Therefore, the revolving body 18 is rotated about the z-axis of the robot coordinate system $C_R$.

The controller 12 operates the revolving body 18, the robot arm 20 and the wrist 22 with reference to the robot coordinate system $C_R$, and arranges the robot hand 50 at a target position and orientation in the robot coordinate system $C_R$.

The robot hand 50 is attached to a distal end part of the wrist 22. Hereinafter, the robot hand 50 is described with reference to FIGS. 3 to 9. The robot hand 50 includes a first base 52, a second base 54, a plurality of grip mechanisms 56, a first movement driving section 58, a second movement driving section 59 (FIGS. 5 and 6), and one gripper driving section 60 (FIGS. 5 and 6).

The first base 52 is detachably attached to the distal end part 22a of the wrist 22. The above-described vision sensor 15 is fixed to a side surface 52a of the first base 52 via a fixture tool 62. The first base 52 is formed with a slot 63 that penetrates the first base 52 in the up and down direction.

Figure 7:
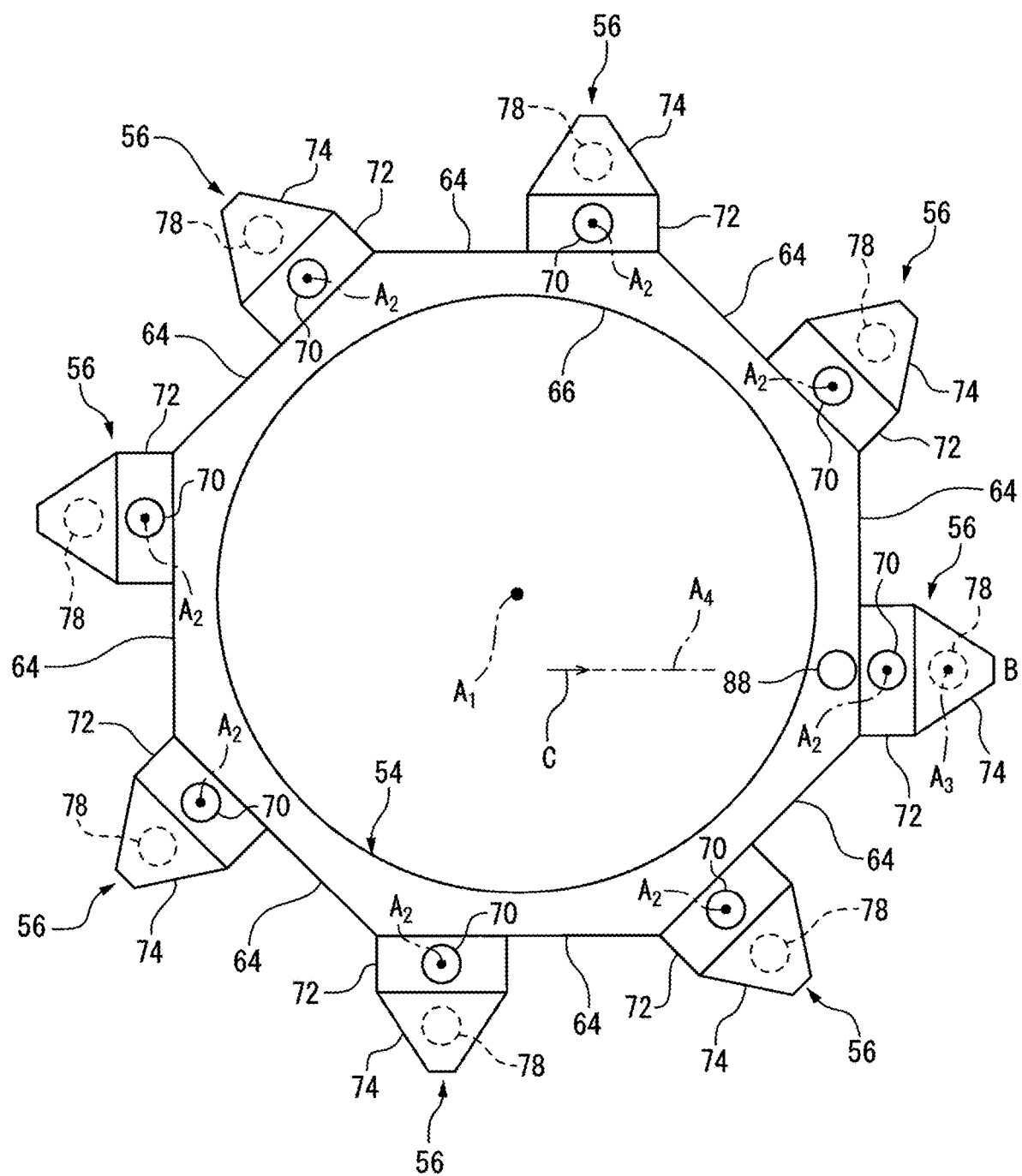
FIG. 7 is a drawing viewing a second base, grip mechanism, and the gear of the gripper driving section illustrated in FIG. 5 from above.

The second base 54 is arranged downward of the first base 52. As illustrated in FIGS. 4, 5 and 7, the second base 54 is a cylindrical member having a center axis $A_1$, and is provided at the first base 52 so as to be rotatable about the axis $A_1$. The second base 54 has an octagonal shape as seen from the direction of the axis $A_1$, and has eight planes 64' defining each side of the octagon. These planes 64 line up around the axis $A_1$ so as to define an outer peripheral surface of the second base 54.

A center hole 66 and a plurality of through holes 68 (FIGS. 3 to 5) are formed in the second base 54. The center hole 66 is formed so as to penetrate the second base 54 in the axis $A_1$ direction. Each through hole 68 is arranged so as to open at each plane 64, and formed to penetrate the second base 54 in the radial direction.

In this embodiment, a total of eight grip mechanisms 56 are arranged on the respective planes 64 of the second base 54, one by one. Hereinafter, the grip mechanism 56 is described with reference to FIGS. 8 and 9. The grip mechanism 56 includes a force transmission member 70, a slider base 72, a slider 74, a motion conversion mechanism 76, a cylinder housing 78, a gripper 80, and a gripper driving mechanism 82.

In this embodiment, the force transmission member 70 is a circular-columnar gear having a central axis $A_2$, and a plurality of teeth are formed on an outer circumference of the force transmission member 70 so as to align in a direction about the axis $A_2$. The force transmission member 70 is supported by the slider base 72 so as to be rotatable about the axis $A_2$. The axis $A_2$ is parallel to the axis $A_1$ of the second base 54.

The slider base 72 is a substantially quadrangular prism shaped hollow member extending in a direction of the axis $A_2$. On both sides of the slider base 72, a pair of rails 83 extending in the direction of the axis $A_2$ is formed.

The slider 74 is provided at the slider base 72 so as to be slidable in the direction of the axis $A_2$. Specifically, the slider 74 includes a main body 74a and a pair of engaging sections 74b integrally fixed to the main body 74a. The pair of engaging sections 74b engages the pair of rails 83, respectively. Due to this, the slider 74 can slide in the direction of the axis $A_2$ without disengaging from the slider base 72.

The motion conversion mechanism 76 is housed inside the slider base 72. The motion conversion mechanism 76 is mechanically connected to the force transmission member 70 and the slider 74, and converts the rotation of the force transmission member 70 about the axis $A_2$ into the reciprocating motion of the slider 74 in the direction of the axis $A_2$. The motion conversion mechanism 76 includes e.g. a ball screw mechanism.

The cylinder housing 78 is a cylindrical member extending along an axis $A_3$, and is fixed to the main body 74a of the slider 74 and extends downwards therefrom. The axis $A_3$ is parallel to the axis $A_2$ of the force transmission member 70 (i.e., the axis $A_1$).

The gripper 80 has a pair of claws 84 capable of opening and closing. These claws 84 are provided so as to be movable in directions toward and away from the axis $A_3$. The gripper 80 can grip an object by clamping the object therebetween.

The gripper driving mechanism 82 is configured to open and close the claws 84. Specifically, the gripper driving mechanism 82 includes a claw driver (not illustrated) configured to generate power to open and close the claws 84, and a motion conversion mechanism 86 configured to convert the power generated by the claw driver into an open and close motion of the claws 84.

The claw driver includes e.g. a pneumatic or hydraulic cylinder, or a servomotor. The claw driver opens and closes the claws 84 in response to a command from the controller 12. A cable for supplying an energy (compressed fluid or electric power) to the claw driver is led into the center hole 66 of the second base 54 through the through hole 68 of the second base 54, and wired to the outside through the center hole 66.

Figure 8:
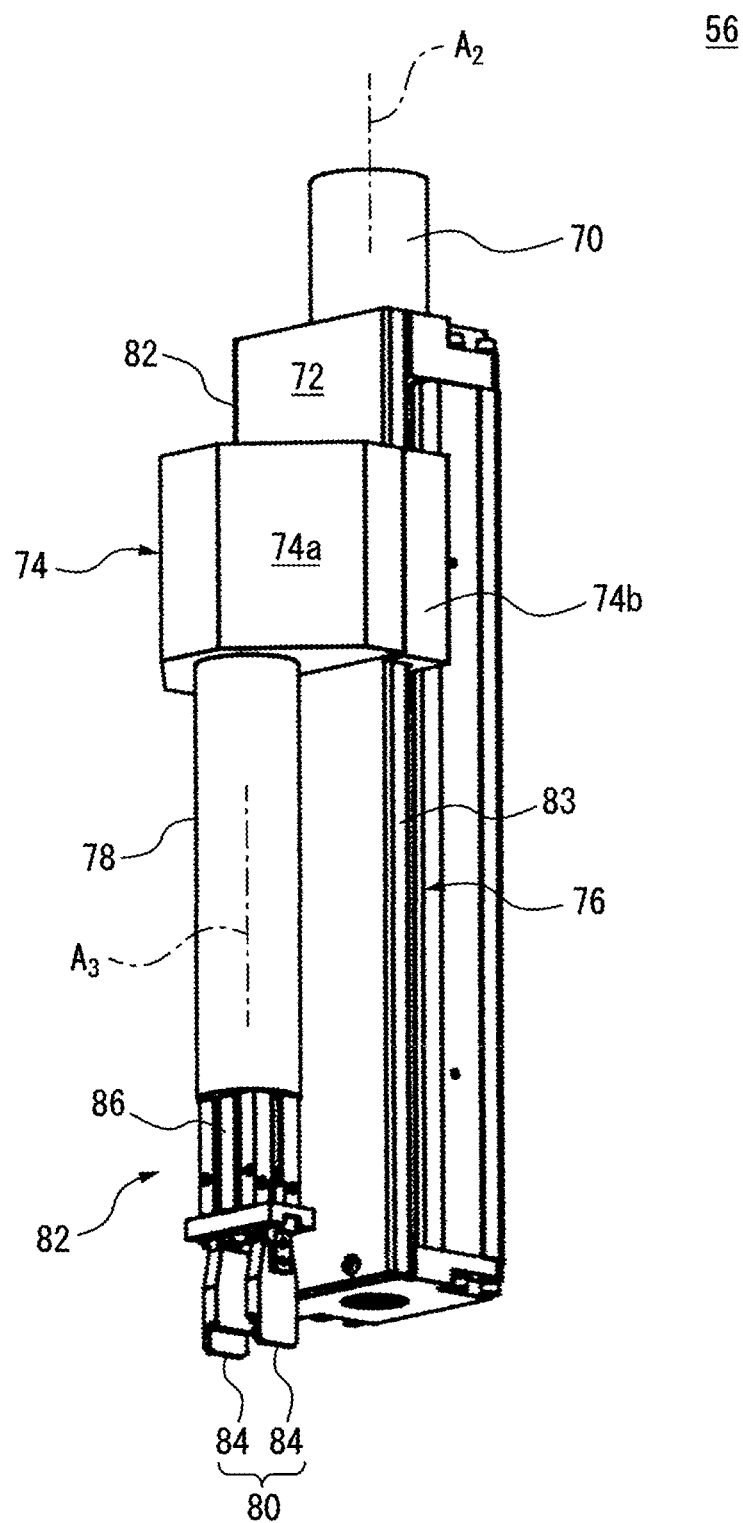
FIG. 8 is a perspective view illustrating one of the grip mechanisms illustrated in FIG. 5, and illustrates a state in which the grip of the grip mechanism is arranged at a retracted position.

In the state illustrated in FIG. 8, the gripper 80 is arranged at a retracted position. When driving force is applied to the force transmission member 70 in the state illustrated in FIG. 8 so as to rotate the force transmission member 70 about the axis $A_2$, the driving force is transmitted to the slider 74 via the motion conversion mechanism 76, and advances the slider 74, the cylinder housing 78, the gripper driving mechanism 82, and the gripper 80, integrally. As a result, the gripper 80 is arranged at an advanced position illustrated in FIG. 9.

Figure 9:
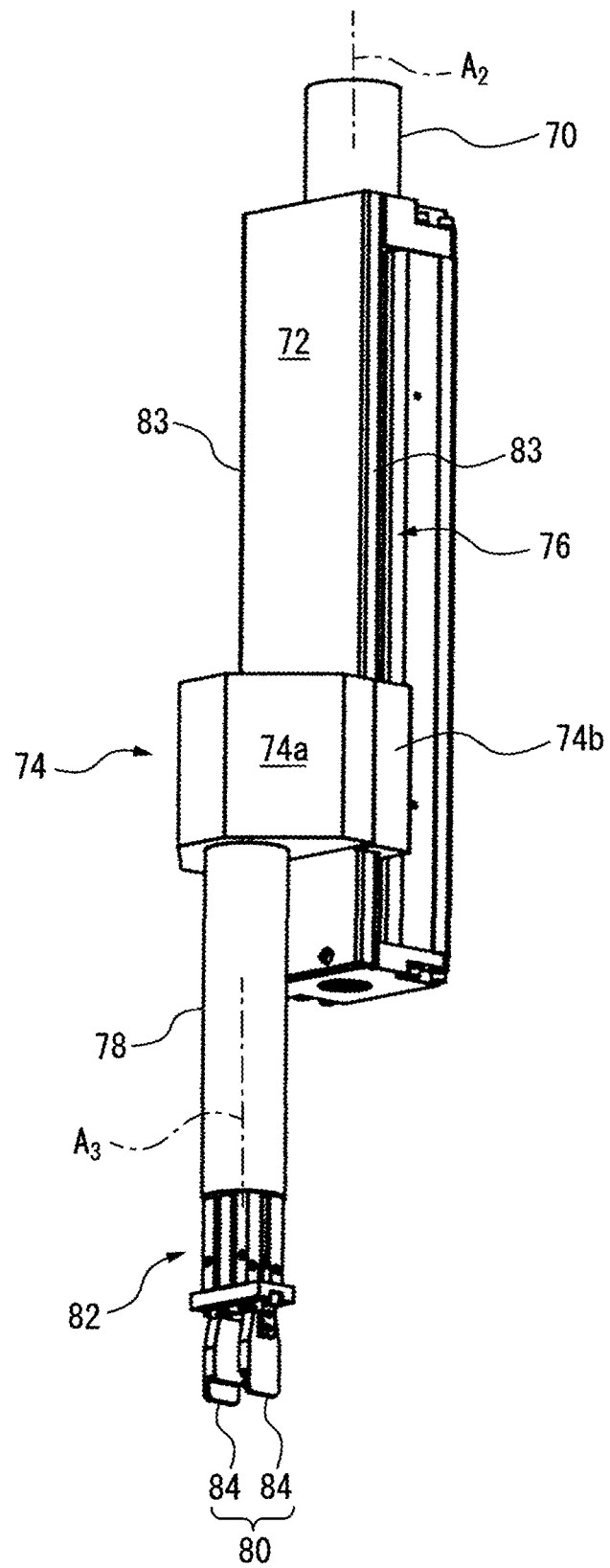
FIG. 9 illustrates a state in which the grip of the grip mechanism illustrated in FIG. 8 is arranged at an advanced position.

On the other hand, when driving force is applied to the force transmission member 70 in the state illustrated in FIG. 9 so as to reversely rotate the force transmission member 70 about the axis $A_2$, the driving force is transmitted to the slider 74 and retracts the slider 74, the cylinder housing 78, the gripper driving mechanism 82, and the gripper 80, integrally. As a result, the gripper 80 returns to the retracted position illustrated in FIG. 8.

As described above, the force transmission member 70 is mechanically connected to the gripper 80 via the motion conversion mechanism 76, the slider 74, the cylinder housing 78 and the gripper driving mechanism 82, and transmits the applied driving force to the gripper 80.

Figure 3:
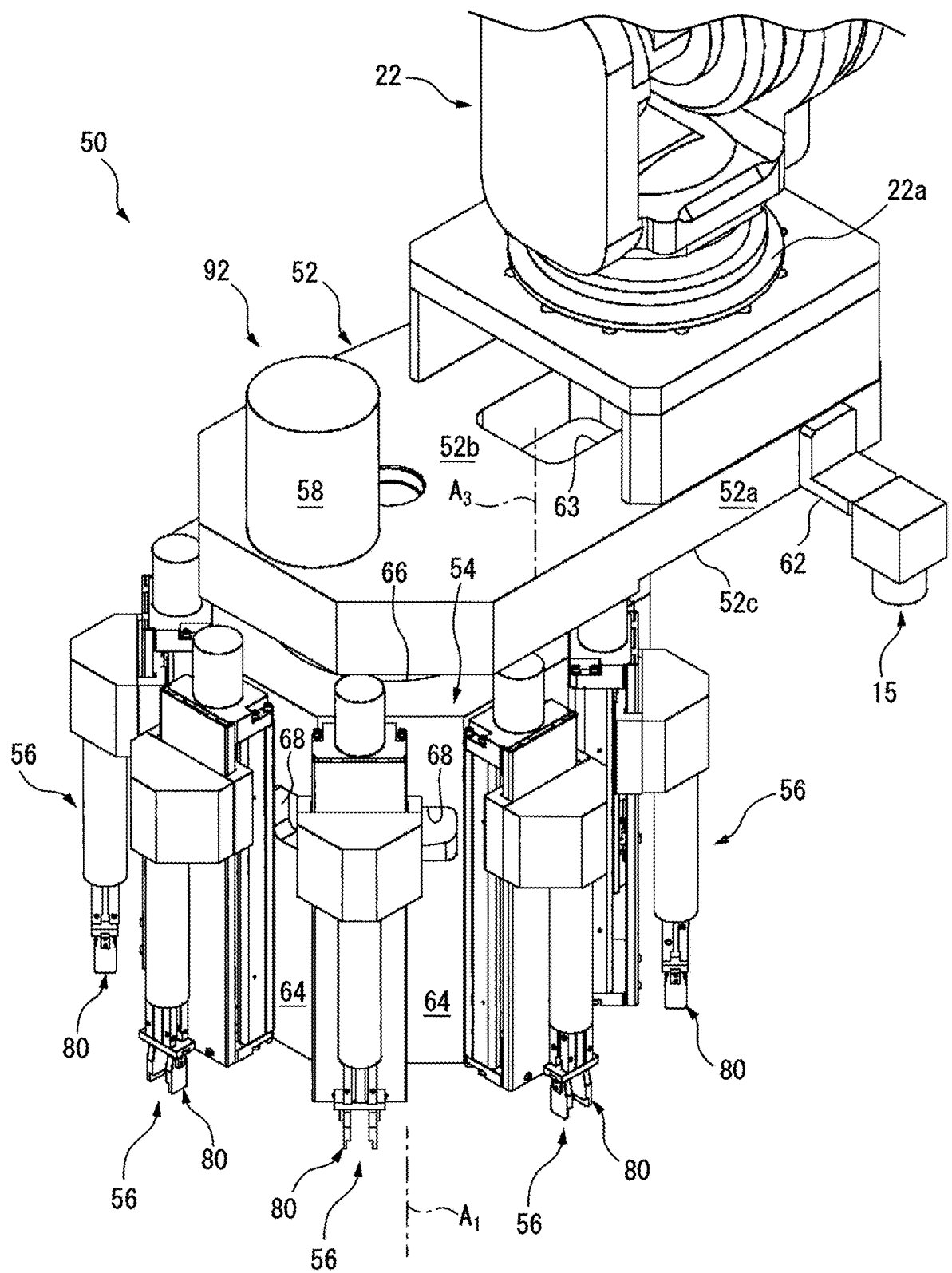
FIG. 3 is a perspective view from above of a robot hand according to an embodiment.
Figure 4:
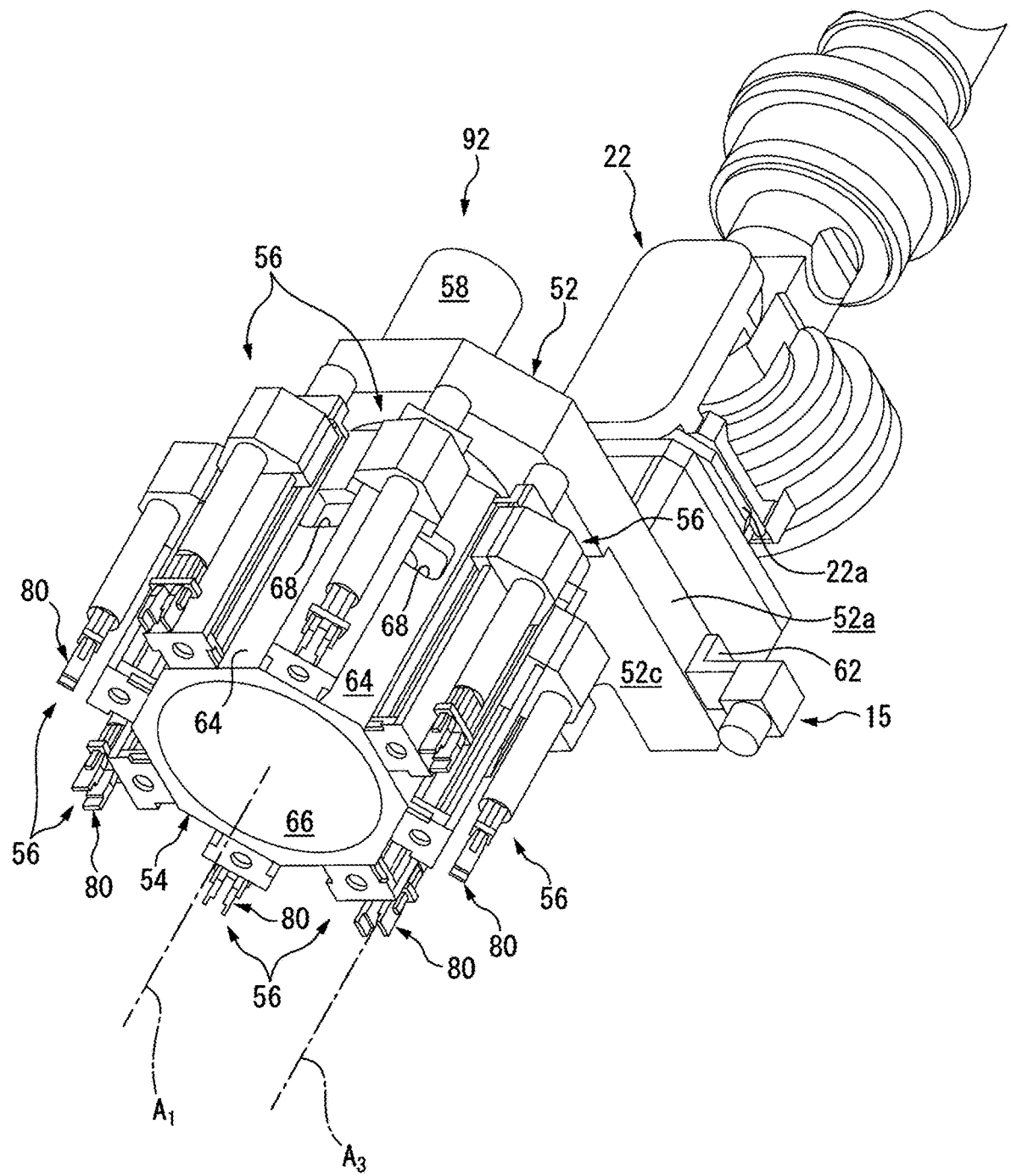
FIG. 4 is a perspective view from below of the robot hand illustrated in FIG. 3.
Figure 5:
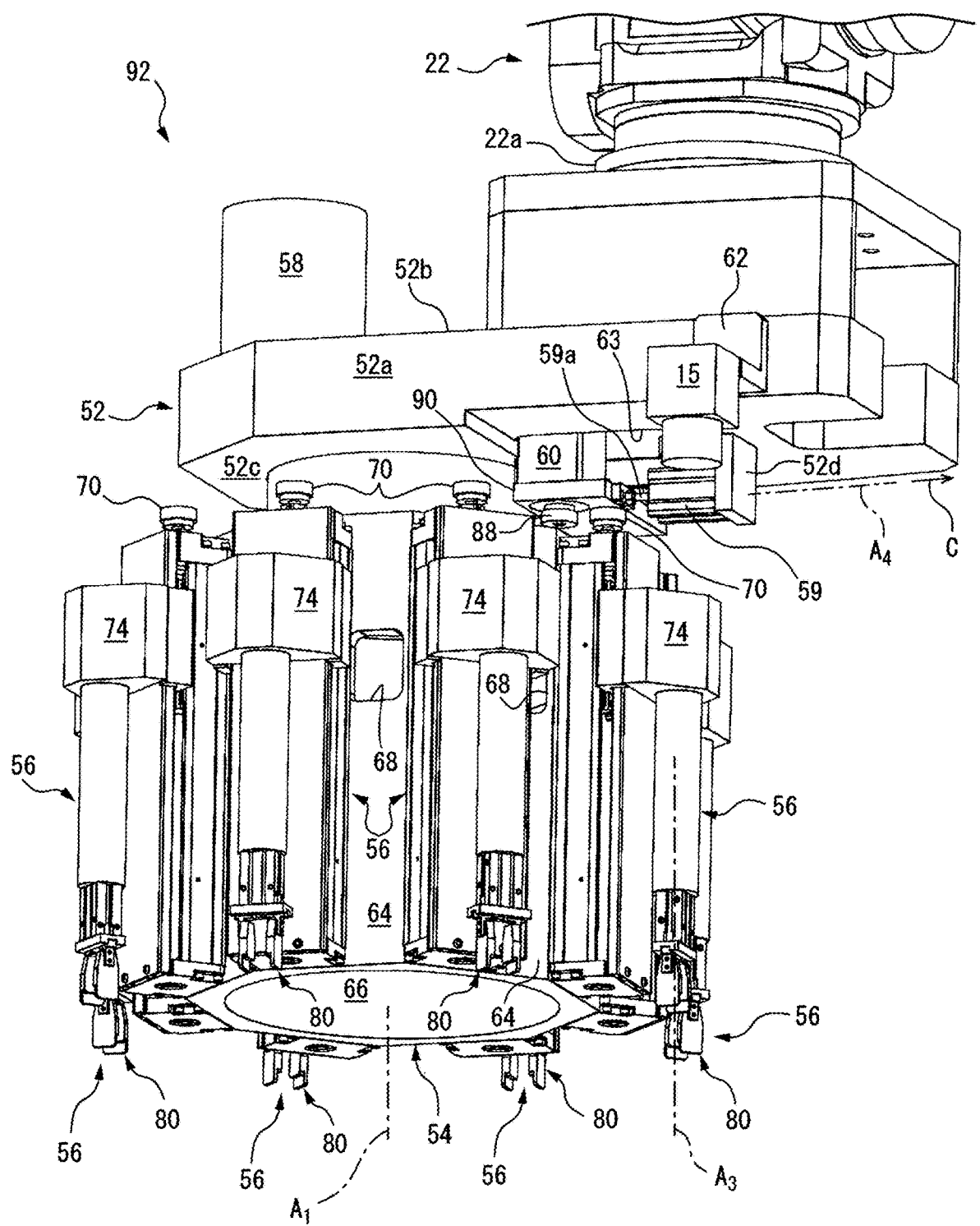
FIG. 5 is a perspective view from side of the robot hand illustrated in FIG. 3.
Figure 6:
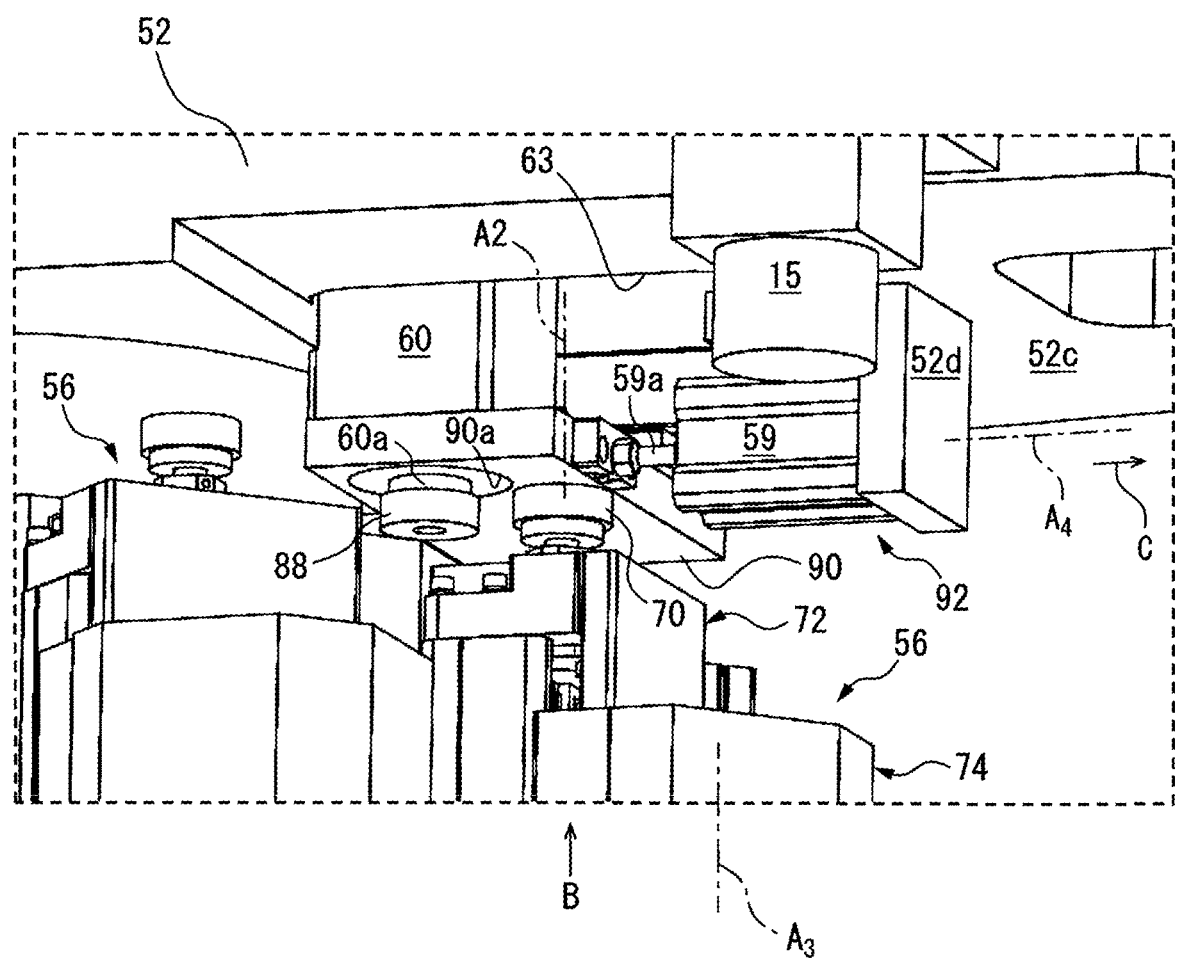
FIG. 6 is an enlarged view enlarging a gripper driving section illustrated in FIG. 5, and illustrates a state in which the gripper driving section is arranged at a disengagement position.

Referring to FIGS. 3 to 5, the first movement driving section 58 is fixed to an upper surface 52b of the first base 52. The first movement driving section 58 includes e.g. a servomotor, and rotates the second base 54 about the axis $A_1$ with respect to the first base 52 in response to a command from the controller 12.

Referring to FIGS. 5 and 6, the gripper driving section 60 is provided in the slot 63 formed at the first base 52, so as to be movable in a direction of an axis $A_4$. The axis $A_4$ is orthogonal to the axis $A_1$ of the second base 54 (or axes $A_2$ and $A_3$), and the slot 63 extends longitudinally along the axis $A_4$.

The gripper driving section 60 includes e.g. a servomotor, and rotates an output shaft 60a thereof (FIG. 6) in response to a command from the controller 12. A gear 88 is fixedly provided at a tip of the output shaft 60a. A support plate 90 is attached to the lower side of the gripper driving section 60, and the gripper driving section 60 is fixed on the support plate 90. The support plate 90 is formed with a through hole 90a (FIG. 6) through which the output shaft 60a passes, and the gear 88 is arranged separate downward from the support plate 90.

The second movement driving section 59 is fixed to a protrusion 52d projecting downward from a lower surface 52c of the first base 52, and is arranged downward of the first base 52. The second movement driving section 59 includes e.g. a pneumatic or hydraulic cylinder, and includes an output shaft 59a extending along the axis $A_4$. A tip of the output shaft 59a is fixed to the support plate 90.

The second movement driving section 59 advances and retracts the output shaft 59a along the axis $A_4$ in response to a command from the controller 12. Along with this operation, the support plate 90 and the gripper driving section 60 is also advanced and retracted along the axis $A_4$.

FIGS. 5 to 7 illustrate a state in which the gripper driving section 60 is arranged at a disengagement position. In this state, the gear 88 fixed to the output shaft 60a of the gripper driving section 60 disengages from the force transmission member 70 of one grip mechanism 56 arranged at an actuation position B. Here, the "actuation position" indicates a position of the grip mechanism 56 around the axis $A_1$ at which the force transmission member 70 of the grip mechanism 56 is able to engage the gear 88 of the gripper driving section 60 when the gripper driving section 60 is arranged at an engagement position described later.

Figure 10:
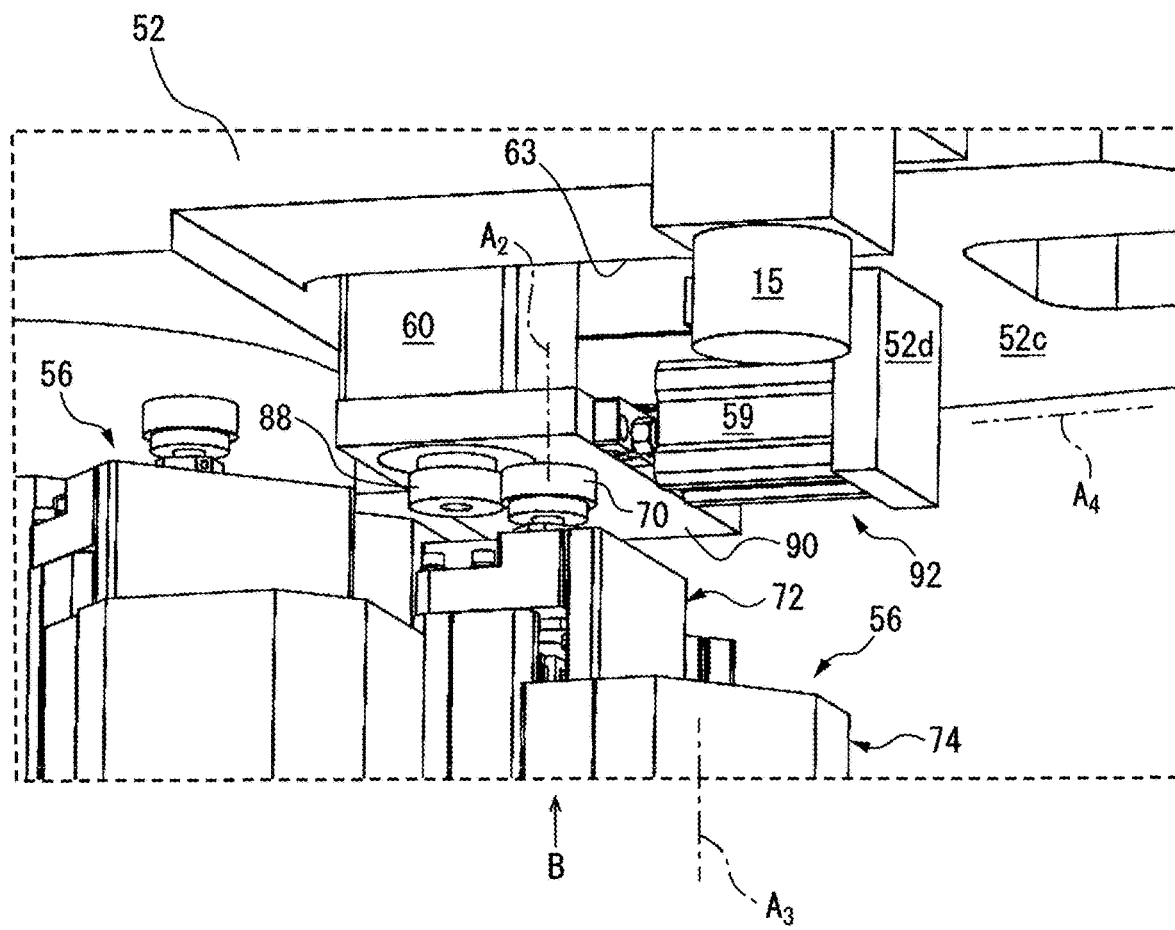
FIG. 10 illustrates a state in which the gripper driving section illustrated in FIG. 6 is arranged at an engagement position.
Figure 11:
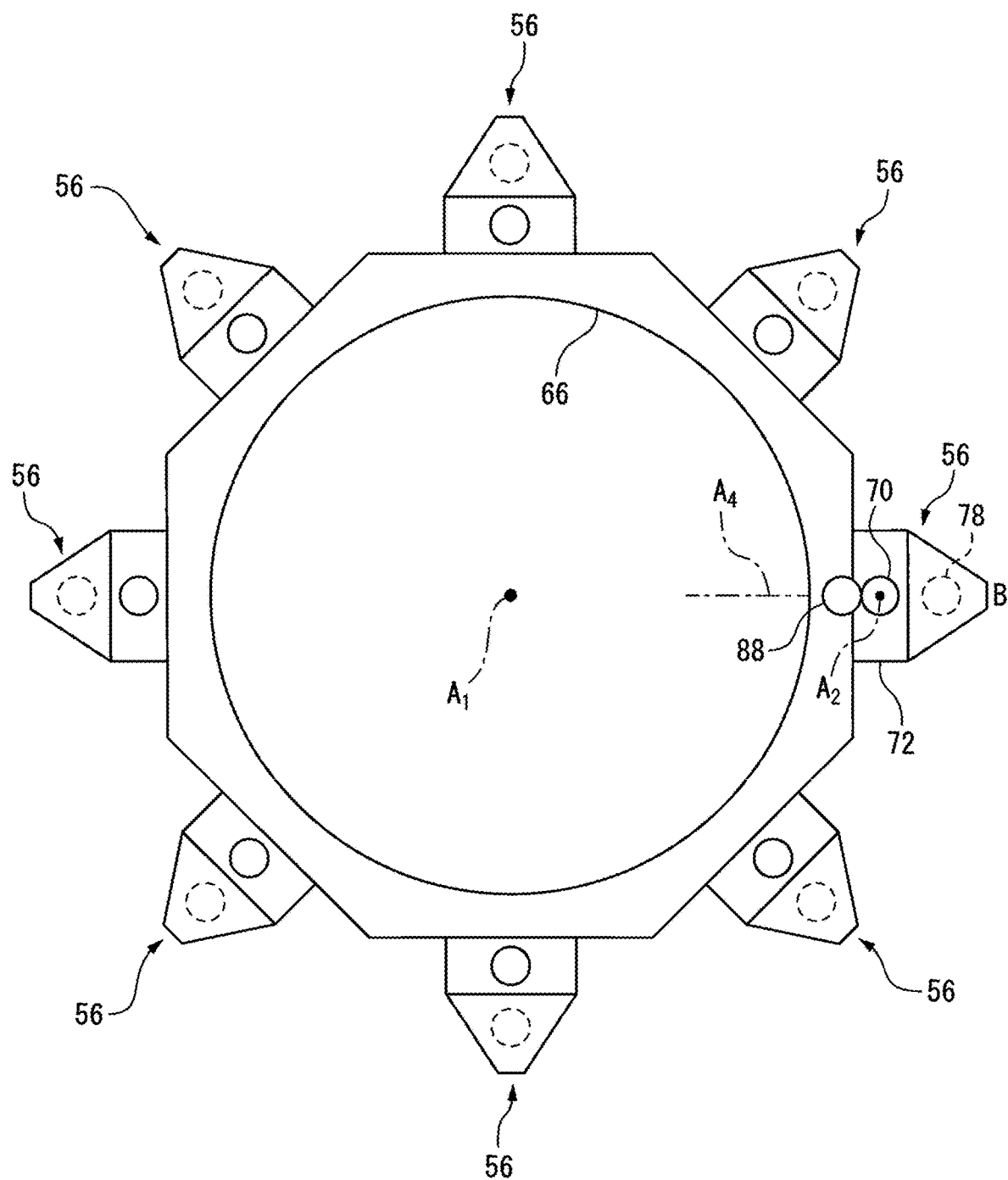
FIG. 11 illustrates a state in which a gear illustrated in FIG. 7 of the gripper driving section is arranged at an engagement position.

When the second movement driving section 59 moves the gripper driving section 60 from the state illustrated in FIGS. 5 to 7 to the direction of the arrow C in the drawing along the axis $A_4$, the gripper driving section 60 is arranged at the engagement position illustrated in FIGS. 10 and 11. When the gripper driving section 60 is arranged at the engagement position, the gear 88 provided at the gripper driving section 60 engages the force transmission member 70 of the grip mechanism 56 arranged at the actuation position B.

If the gripper driving section 60 rotates the gear 88 while the gear 88 and the force transmission member 70 engage with each other in this way, the driving force is applied from the gear 88 to the force transmission member 70 so as to rotate the force transmission member 70 about the axis $A_2$. As a result, the driving force is transmitted to the gripper 80 so as to advance and retract the gripper 80 as described above. In this way, the grip mechanism 56 arranged at the actuation position B is actuated by the gripper driving section 60.

Then, the second movement driving section 59 returns the gripper driving section 60 to the disengagement position illustrated in FIGS. 6 and 7, and then, the first movement driving section 58 rotates the second base 54 about the axis $A_2$ by 45 degrees relative to the first base 52. As a result, the eight grip mechanisms 56 rotate about the axis $A_2$ relative to the gripper driving section 60, and other grip mechanism 56, that adjoins in the direction around the axis $A_2$ to the grip mechanism 56 most-recently arranged at the actuation position B, is then arranged at the actuation position B.

Then, the second movement driving section 59 moves the gripper driving section 60 to the engagement position so as to engage the gear 88 of the gripper driving section 60 with the force transmission member 70 of the other grip mechanism 56. Then, the gripper driving section 60 applies driving force to the force transmission member 70 of the other grip mechanism 56 so as to advance and retract the gripper 80 of the other grip mechanism 56.

Thus, in this embodiment, the gear 88 of the gripper driving section 60 engages the force transmission member 70 of one grip mechanism 56 (i.e., the grip mechanism 56 arranged at the actuation position B) selected from the eight grip mechanisms 56. In other words, the gear 88 of the gripper driving section 60 selectively engages each of the force transmission members 70 of the eight grip mechanisms 56.

The first movement driving section 58 and the second movement driving section 59 move the gripper driving section 60 and the eight grip mechanisms 56 relative to each other such that the gear 88 of the gripper driving section 60 selectively engages the respective grip mechanisms 56. Therefore, the first movement driving section 58 and the second movement driving section 59 constitute a movement mechanism 92 configured to move the gripper driving section 60 and the plurality of grip mechanisms 56 relative to each other.

As described above, in the robot hand 50 according to this embodiment, one gripper driving section 60 selectively engages the respective force transmission members 70 of the plurality of grip mechanisms 56, and each gripper 80 is actuated by the one gripper driving section 60. According to this configuration, since it is not necessary to provide a plurality of driving sections for actuating a plurality of grippers 80, weight of the robot hand 50, as well as a manufacturing cost thereof, can be reduced.

Further, when carrying out picking up connectors of a wire harness by the gripper 80 of the robot hand 50, or connecting the gripped connector to a counterpart connector, the controller 12 simply controls a position and orientation (e.g. a position and orientation of the axis $A_3$) of one gripper 80 arranged at the actuation position B. Therefore, the robot program for control can be simplified since the number of components to be controlled can be reduced.

Next, a method of handling a wire harness 100 using the robot hand 50 is described with reference to FIG. 12. In this embodiment, the wire harness 100 includes a total of seven connectors 102 having a substantially rectangular shape, and a wire member 104 that interconnects the connectors 102, as described in FIG. 13.

A sign 106 is attached to a predetermined position of the wire member 104. The sign 106 may be e.g. a mark engraved on the wire member 104, or may be a sticker provided to be separate from the wire member 104 and attached to the wire member 104.

Figure 12:
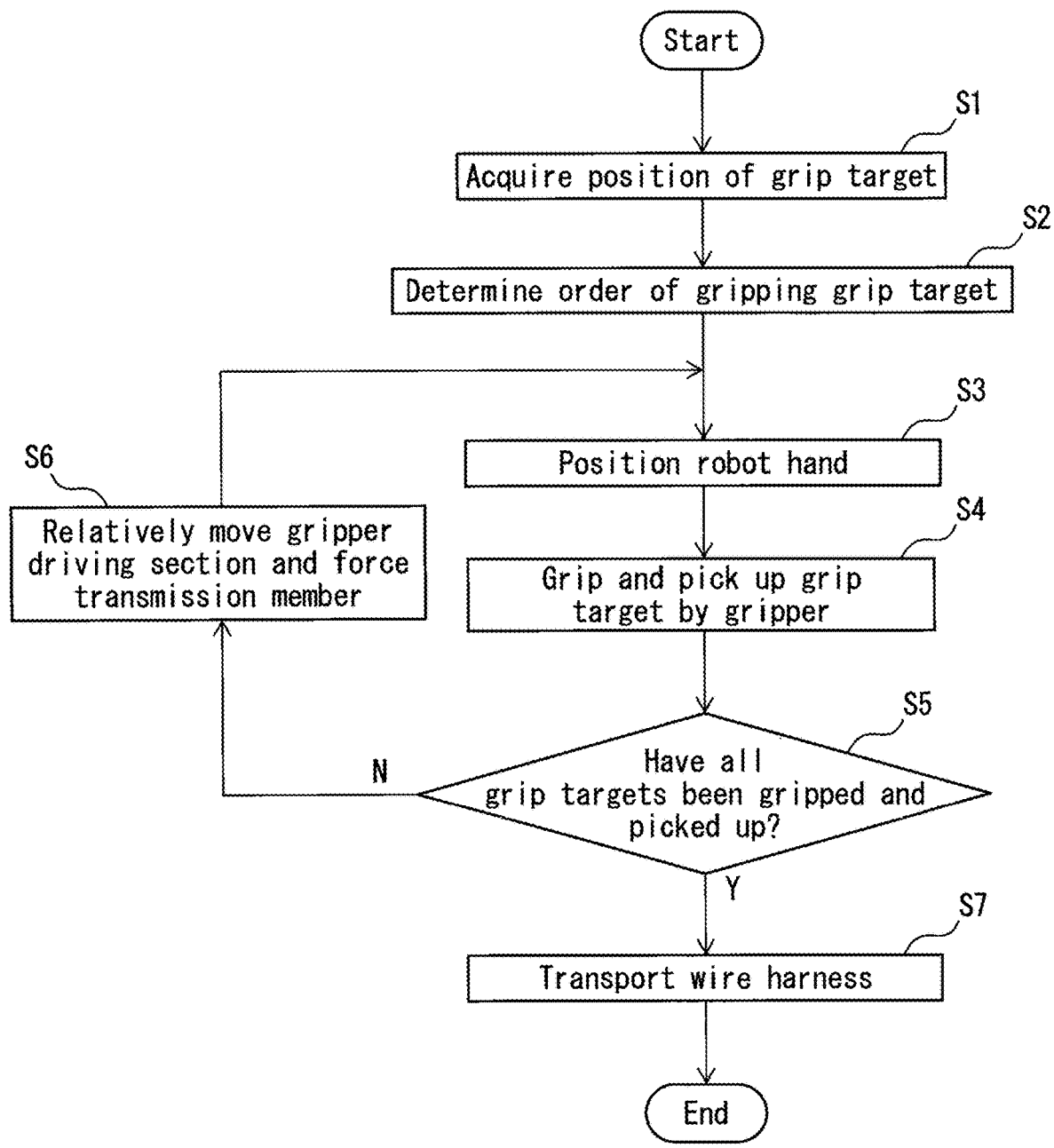
FIG. 12 illustrates a flow chart of a method for handling a wire harness according to an embodiment.

The flow illustrated in FIG. 12 is started when the controller 12 receives a handling start command from an operator, a host controller, or a computer program. At the start of the flow illustrated in FIG. 12, one grip mechanism 56 selected from the eight grip mechanisms 56 is arranged at the actuation position B. Further, the gripper driving section 60 is arranged at the engagement position, and therefore the gear 88 of the gripper driving section 60 engages the force transmission member 70 of the one selected grip mechanism 56.

When the flow illustrated in FIG. 12 is started, the wire harness 100 is placed by an operator or another robot at a predetermined placement location apart from the robot hand 50. At this time, the connectors 102 of the wire harness 100 may be fixed by a jig, or may be placed without being fixed.

In step S1, the controller 12 acquires the positions of the connectors 102 and the wire member 104 that are to be grip targets. Specifically, the controller 12 operates the robot 14 so as to move the vision sensor 15 (i.e., the robot hand 50) such that the wire harness 100 is within a field of view of the vision sensor 15.

Then, the controller 12 transmits an imaging command to the vision sensor 15. When receiving the imaging command, the vision sensor 15 images the wire harness 100, and analyzes the captured image in order to identify the connectors 102 and the sign 106.

Then, the vision sensor 15 acquires positional information of the grip targets, which includes information of positions and orientations in the robot coordinate system $C_R$ of the identified connectors 102 and information of a position of the sign 106 in the robot coordinate system $C_R$, and transmits the positional information to the controller 12. In this way, the controller 12 acquires from the vision sensor 15 the positions of the connectors 102 and the wire member 104 that are to be the grip targets, and stores them in a memory.

It should be noted that, when the connectors 102 and the wire member 104 of the wire harness 100 are positioned known positions in the robot coordinate system $C_R$ e.g. by a jig, the controller 12 does not need to image the wire harness 100 by the vision sensor 15.

In this case, the positional information of each connector 102 and the wire member 104 in the robot coordinate system $C_R$ is pre-stored in the memory of the controller 12. The controller 12 reads out from the memory to acquire the positional information of the connectors 102 and the wire member 104 that are to be the grip targets, in this step S1. Therefore, the vision sensor 15 can be omitted in this case.

In step S2, the controller 12 determines an order of gripping the connectors 102 and the wire member 104 that are the grip targets. Specifically, the controller 12 recognizes the connectors 102 and the sign 106 as the grip targets from the positional information acquired in step S1, and determines the order of gripping the connectors 102 and the wire member 104.

Figure 13:
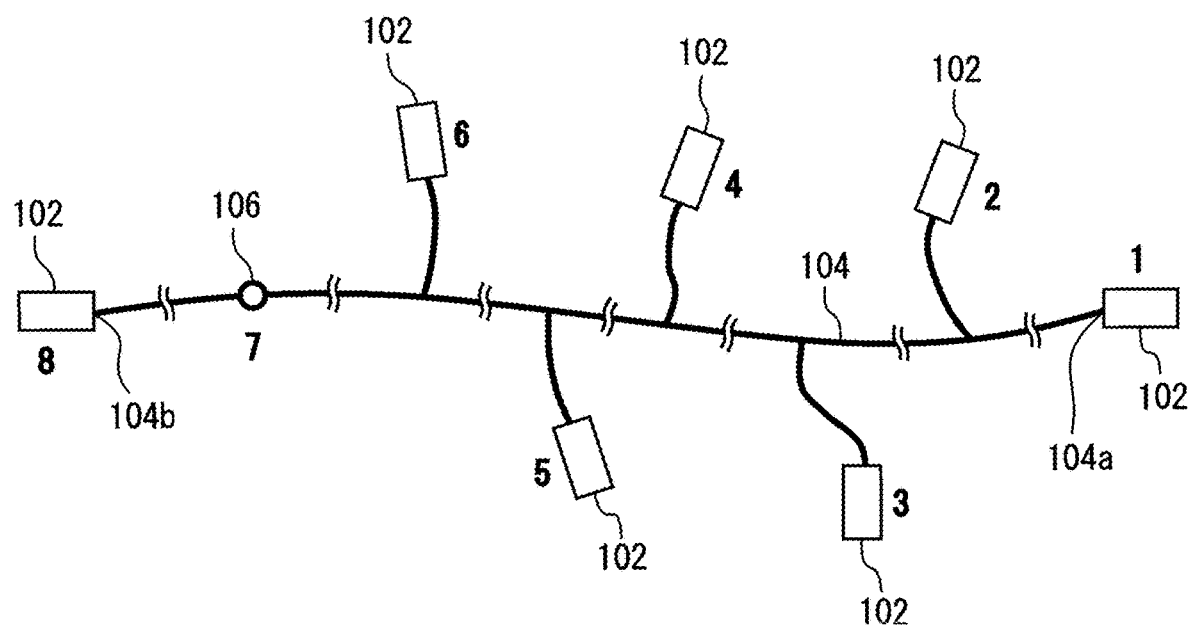
FIG. 13 illustrates an example of the wire harness.

As an example, the controller 12 determines the order of gripping the connectors 102 and the sign 106 along the direction from one end 104a of the wire member 104 toward the other end 104b of the wire member 104, as indicated by the numbers 1 to 8 in FIG. 13. In this example, a grip target (the connector 102 or the sign 106) denoted by the number "n" ("n" is an integer from 1 to 7) and a grip target (the connector 102 or the sign 106) denoted by the number "n+1" are adjacent to each other.

As illustrated in FIG. 12, the controller 12 carries out a loop of steps S3 to S6 until it determines YES at step S5 described later. In step S3, the controller 12 positions the robot hand 50. Specifically, the controller 12 operates the robot 14 so as to position the robot hand 50 relative to the connector 102 or the sign 106 that is the grip target, such that the connector 102 or the sign 106 that is the grip target is within a motion range of the gripper 80 of the grip mechanism 56 arranged at the actuation position B at the start of this step S3.

The controller 12 pre-stores the positional relation of the gripping position with respect to the robot hand tip part (wrist 22) when the gripper 80 of the grip mechanism 56 arranged at the actuation position B grips an object. For example, the controller 12 pre-stores the positional relation of the axis $A_3$ (FIGS. 5 to 7) of the grip mechanism 56 arranged at the actuation position B with respect to the wrist 22.

In this step S3, the controller 12 operates the robot 14, based on the positional relation of the gripping position (axis $A_3$) of the grip mechanism 56 arranged at the actuation position B and on the positional information of the grip target acquired in step S2, so as to move the robot hand 50 such that the grip target is within the motion range of the gripper 80 of the grip mechanism 56 arranged at the actuation position B.

For example, when step S3 is executed for the first time ($1^{st}$ step S3), the controller 12 positions the robot hand 50 such that the rightmost connector 102 in FIG. 13 that have been determined as a first grip target in step S2 is within the motion range of the gripper 80 (i.e., within the path of advancing and retracting movement of the gripper 80) of the grip mechanism 56 currently arranged at the actuation position B.

Figure 14:
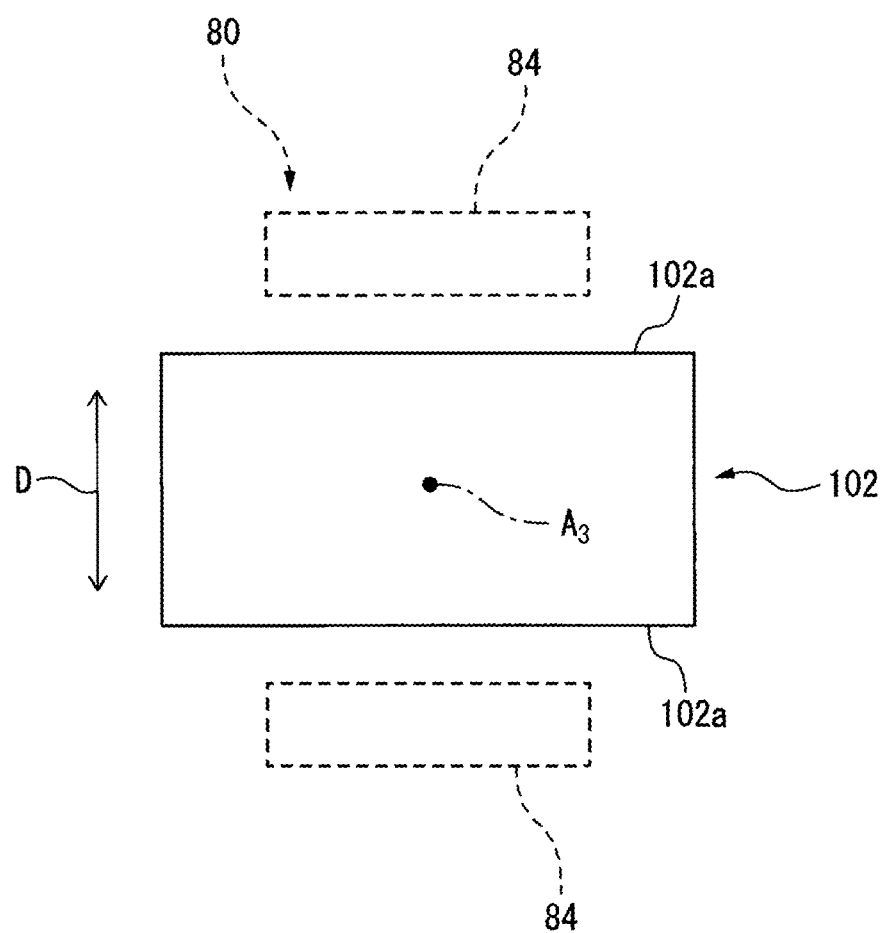
FIG. 14 illustrates a positional relation of the grip and the connector when step S3 in FIG. 12 ends.

At this time, as illustrated in FIG. 14, the controller 12 positions the gripper 80 relative to the connector 102 such that the axis $A_3$ of the grip mechanism 56 arranged at the actuation position B intersects with a predetermined position (e.g. a center) of the grip target connector 102, and that the opening and closing direction D of the claws 84 is orthogonal to both side surfaces 102a that define the longitudinal side of the connector 102.

On the other hand, when step S3 is executed for the seventh time, the controller 12 positions the robot hand 50 such that the sign 106 that have been determined as the seventh grip target in step S2 is within the motion range of the gripper 80 of the grip mechanism 56 currently arranged at the actuation position B.

Figure 15:
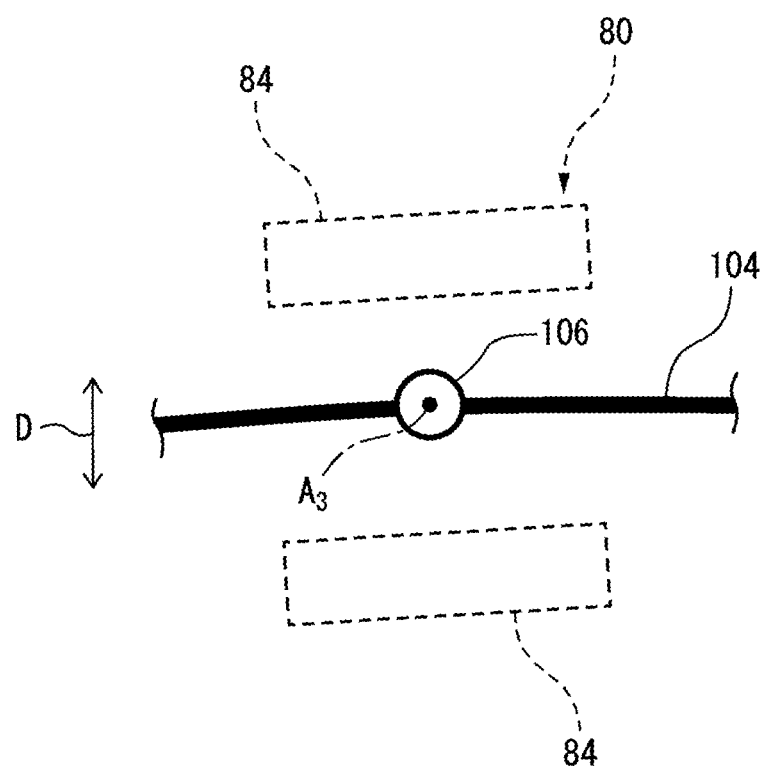
FIG. 15 illustrates a positional relation of the grip and a sign when step S3 in FIG. 12 ends.

At this time, as illustrated in FIG. 15, the controller 12 positions the gripper 80 relative to the sign 106 such that the axis $A_3$ of the grip mechanism 56 arranged at the actuation position B intersects with the grip target sign 106, and that the opening and closing direction D of the claws 84 is substantially orthogonal to an extending direction of the wire member 104.

In step S4, the controller 12 grips and picks up the grip target by the gripper 80. Specifically, the controller 12 operates the gripper driving section 60, so as to move the gripper 80 of the grip mechanism 56 arranged at the actuation position B at this time from the retracted position (FIG. 8) to the advanced position (FIG. 9). As a result, the grip target connector 102 or sign 106 is placed between the claws 84 of the gripper 80.

Then, the controller 12 operates the gripper driving mechanism 82 so as to move the claws 84 toward the axis $A_3$ to close the claws 84. As a result, the connector 102 is clamped by the claws 84 at both side surfaces 102a, or the wire member 104 is clamped by the claws 84 at the position of the sign 106. In this way, the gripper 80 grips the grip target (the connector 102 or the sign 106).

Then, the controller 12 operates the gripper driving section 60 so as to move the gripper 80 of the grip mechanism 56 arranged at the actuation position B from the advanced position to the retracted position. Whereby, the grip target (the connector 102 or the wire member 104) is picked-up by the gripper 80.

In step S5, the controller 12 determines whether or not all the grip targets have been gripped and picked up. For example, the controller 12 counts the number "n" of execution of step S4, and determines whether or not the number "n" is 8. The controller 12 determines YES when the number "n" is 8, and proceeds to step S7. On the other hand, the controller 12 determines NO when the number "n" is equal to or less than 7, and proceeds to step S6.

In step S6, the controller 12 moves the gripper driving section 60 and a plurality of grip mechanisms 56 (i.e., the force transmission member 70) relative to each other. Specifically, the controller 12 moves the second movement driving section 59 so as to move the gripper driving section 60 to the disengagement position (FIG. 6).

Then, the controller 12 operates the first movement driving section 58 so as to rotate the second base 54 about the axis $A_2$ by 45 degrees relative to the first base 52. Due to this, other grip mechanism 56, that is next to the grip mechanism 56 arranged at the actuation position B at the start of this step S6, is newly arranged at the actuation position B.

Then, the controller 12 operates the second movement driving section 59 so as to move the gripper driving section 60 to the engagement position. As a result, the gear 88 of the gripper driving section 60 engages the force transmission member 70 of the other grip mechanism 56 newly arranged at the actuation position B. Then, the controller 12 returns to step S3 and positions the gripper 80 of the other grip mechanism 56 relative to next grip target (the connector 102 or the sign 106), and then, grips and picks up the next grip target by the gripper 80 in step S4.

In step S7, the controller 12 maintains the eight grip mechanisms 56, each of which grips the grip target, to be arranged at their retracted positions, along with which, operates the robot 14 so as to move the robot hand 50 to transport the wire harness 100 gripped by eight grippers 80 to a predetermined location. In this way, the wire harness 100 can be transported using the robot hand 50 by gripping each of the plurality of connectors 102 by the gripper 80.

In this embodiment, the connectors 102 and the wire member 104 that are the grip targets are gripped and picked up by the plurality of grippers 80 configured to advance and retreat independently from each other, and then, the wire harness 100 is transported while the connectors 102 and the wire member 104 are gripped. According to this configuration, the process of transporting the wire harness 100 with the plurality of connectors 102 can be automated.

Further, in this embodiment, each of the plurality of grippers 80 is advanced and retreated one by one in order to grip and pick up the grip target (the connector 102 or the wire member 104), it is possible to pick up the wire harness 100 while preventing the entanglement of the wire member 104 due to the picking-up operation by the gripper 80.

Further, in this embodiment, the gripper 80 also grips and picks up the wire member 104. According to this configuration, when a section of the wire member 104 extending between two adjacent connectors 102 is great in length for example, the loosening of the wire member 104 in this section can be prevented by being gripped by the gripper 80. Therefore, it is possible to prevent the wire member 104 from being entangled with other member in the picking-up operation or the transporting operation.

Further, in this embodiment, the sign 106 is applied to the wire member 104, the position of the sign 106 is acquired by the image captured by the vision sensor 15, and the wire member 104 is gripped at the position of the sign 106 by one gripper 80. According to this configuration, the wire member 104 can be accurately gripped by the gripper 80 at a desired position.

Figure 16:
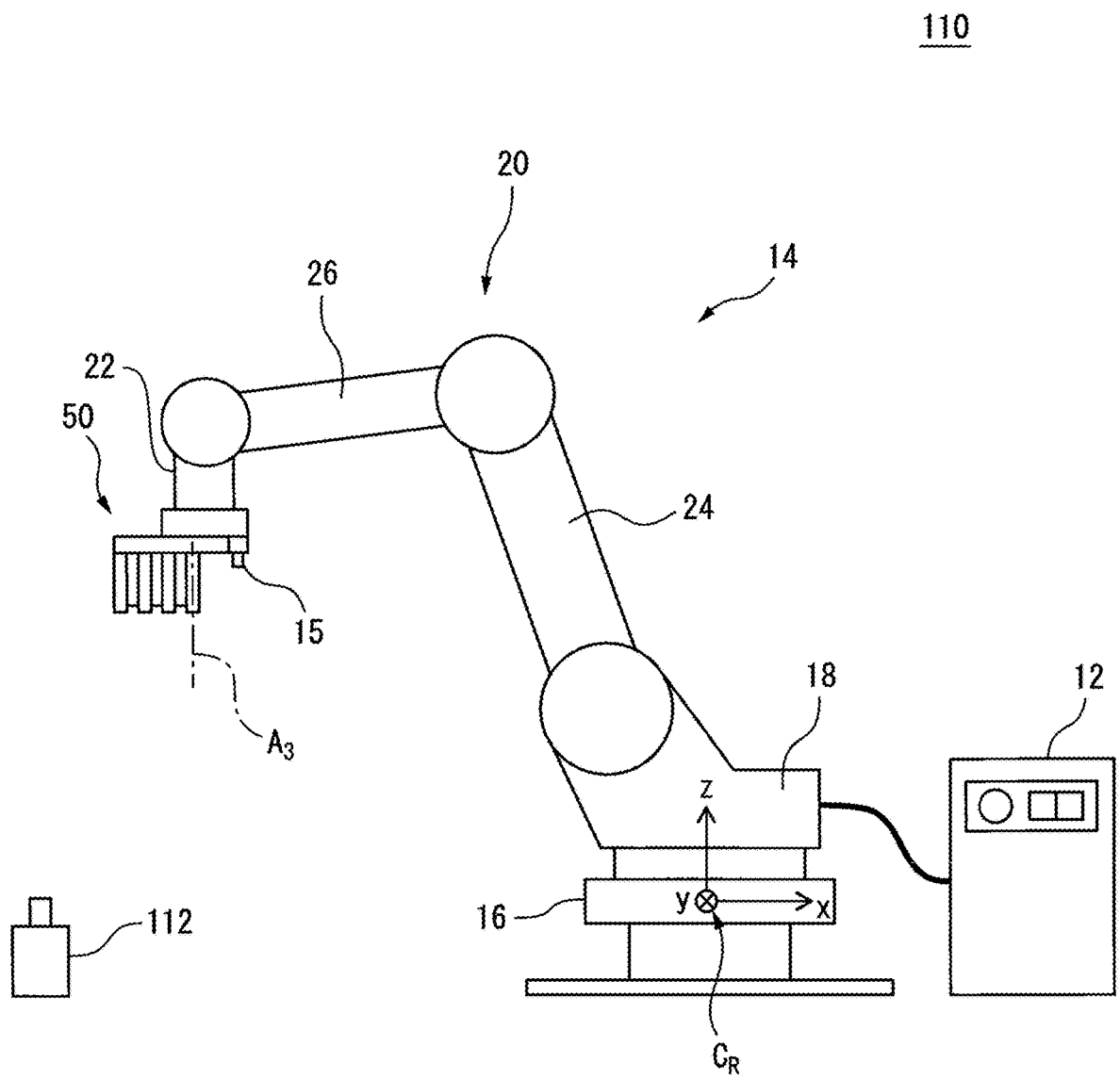
FIG. 16 illustrates a robot system according to another embodiment.
Figure 17:
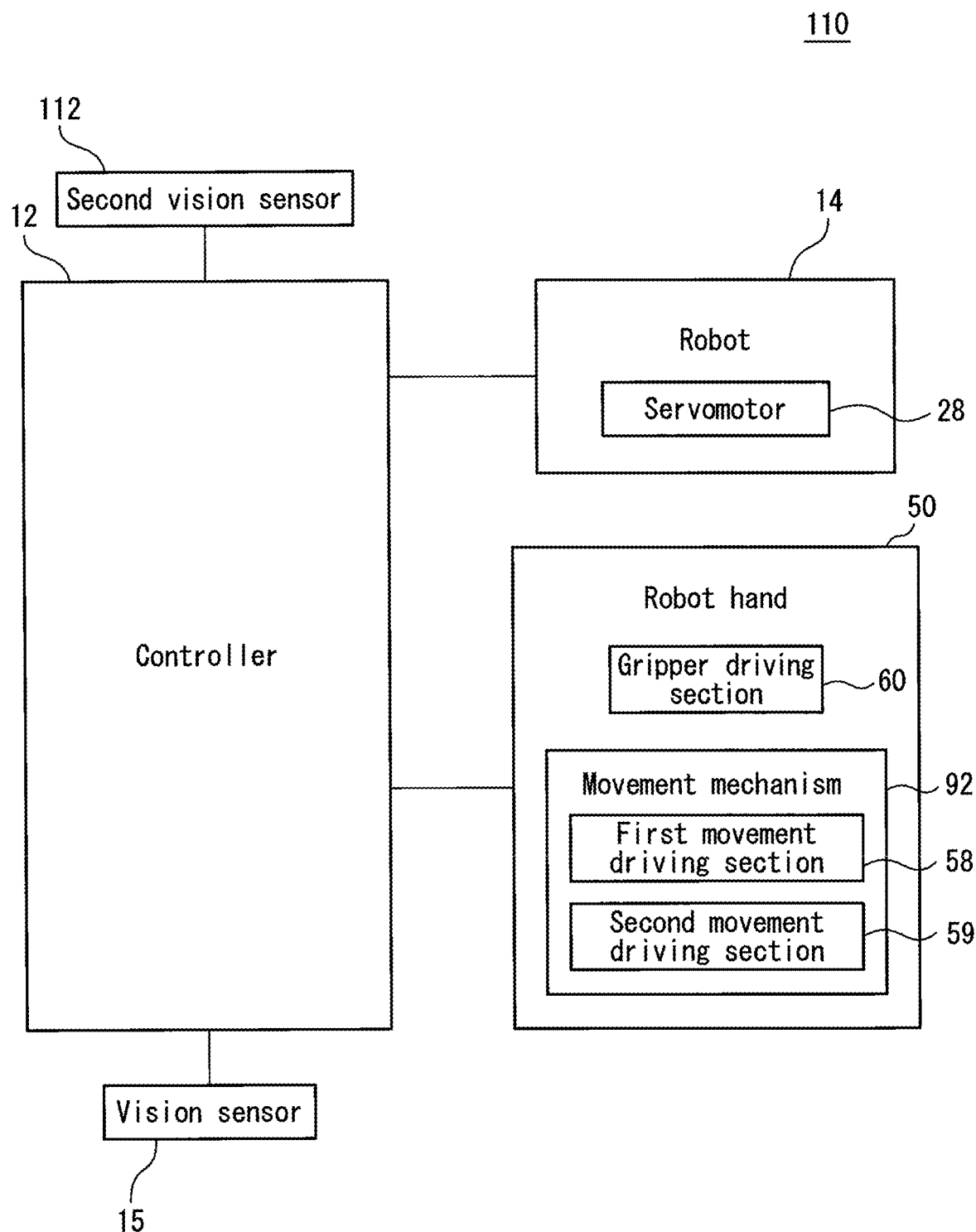
FIG. 17 is a block drawing of the robot system illustrated in FIG. 16.

With reference to FIGS. 16 and 17, a robot system 110 according to another embodiment will be described. The robot system 110 is different from the above-described robot system 10 in that it further includes a second vision sensor 112. The second vision sensor 112 is fixed at a predetermined position in the robot coordinate system $C_R$. For example, the second vision sensor 112 is a three-dimensional vision sensor including an imaging sensor, an optical lens, an image processor, etc., similar to the above-described vision sensor 15.

Next, a method of handling a wire harness 100 using the robot hand 50 of the robot system 110 is described with reference to FIG. 18. The flow illustrated in FIG. 18 is started when the controller 12 of the robot system 110 receives a handling start command from an operator, a host controller, or a computer program.

Figure 18:
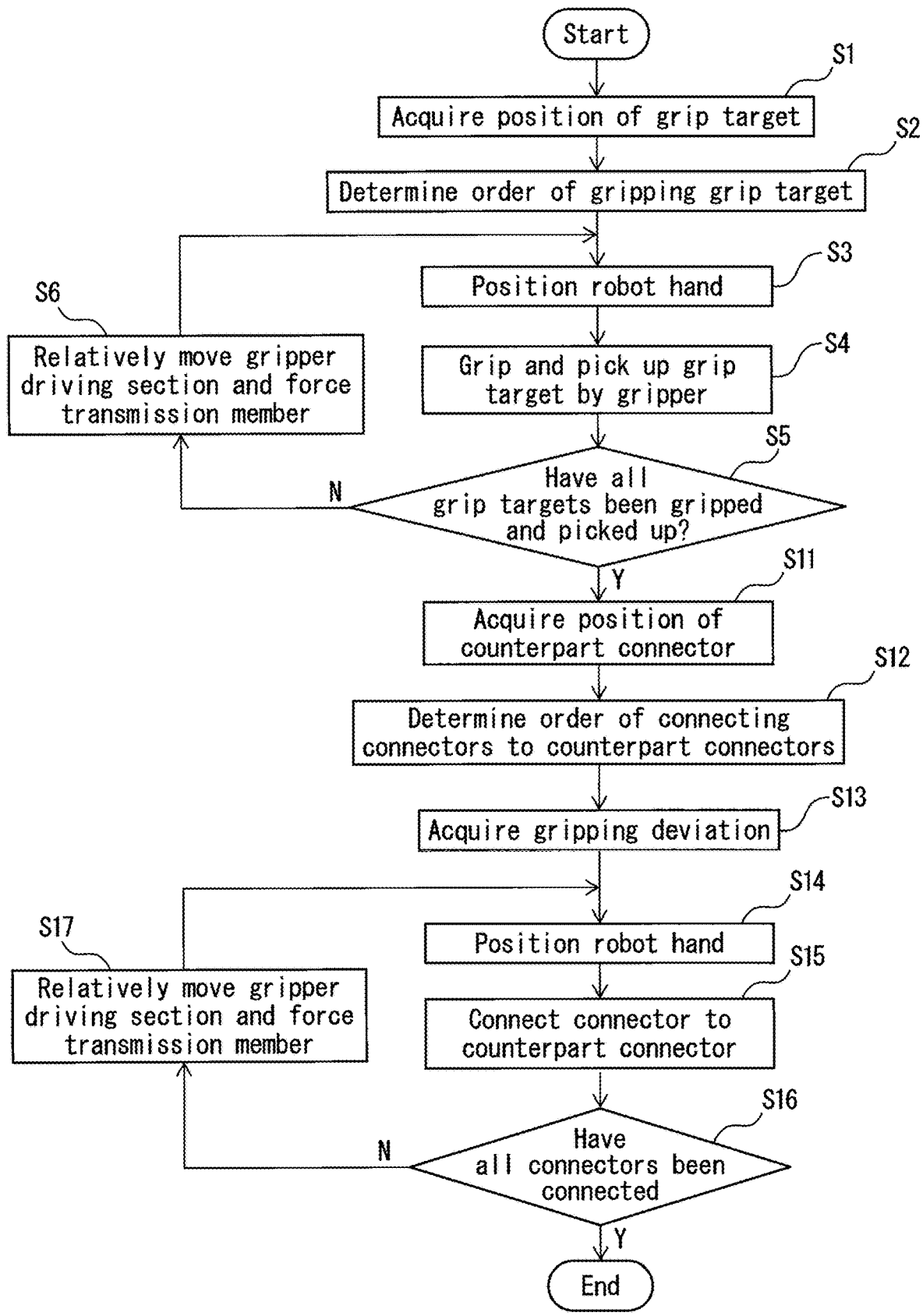
FIG. 18 illustrates a flow chart of a method for handling a wire harness according to another embodiment.
Figure 19:
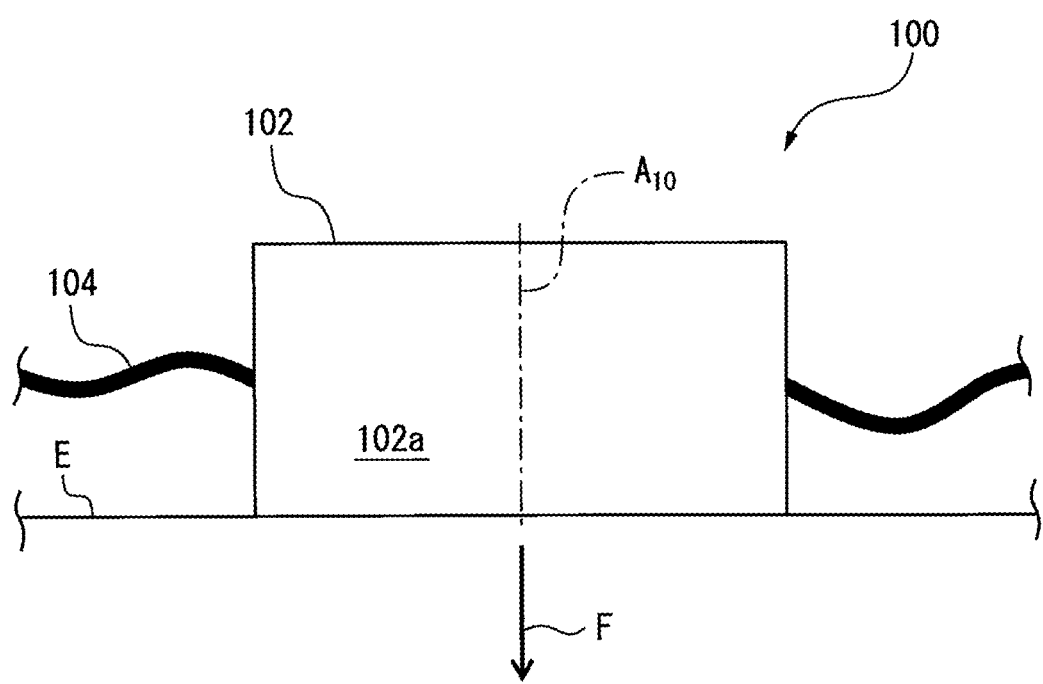
FIG. 19 illustrates an example of a mounting state of the wire harness at the start of the flow in FIG. 18.

When the flow illustrated in FIG. 18 is started, the wire harness 100 is placed by an operator or another robot at a predetermined placement location apart from the robot hand 50. At this time, each of the connectors 102 is placed on a placement surface E of the placement location in an orientation as illustrated in FIG. 19.

In the example illustrated in FIG. 19, a central axis $A_{10}$ of the connector 102 is parallel to a connection direction F in which the connector 102 is inserted to the counterpart connector described later, and the connection direction F is oriented toward the placement surface E. Each of the connectors 102 may be fixed in the orientation illustrated in FIG. 19 e.g. by a jig, or an operator may place the connector 102 in the orientation illustrated in FIG. 19 without fixing it by a jig.

After the flow illustrated in FIG. 18 is started, the controller 12 carries out steps S1 to S6 similarly to the flow illustrated in FIG. 12, and grips the connectors 102 and the wire member 104 of the wire harness 100 by the gripper 80 of the robot hand 50.

In this connection, when the robot hand 50 is positioned in step S3 if the grip target of the gripper 80 is the connector 102, the controller 12 positions the robot hand 50 in a positional relation in which the axis $A_3$ of the grip mechanism 56 arranged at the actuation position B coincides with the axis $A_{10}$ of the grip target connector 102, and the opening and closing direction D (FIG. 14) of the claws 84 is orthogonal to the side surface 102a of the connector 102.

Figure 20:
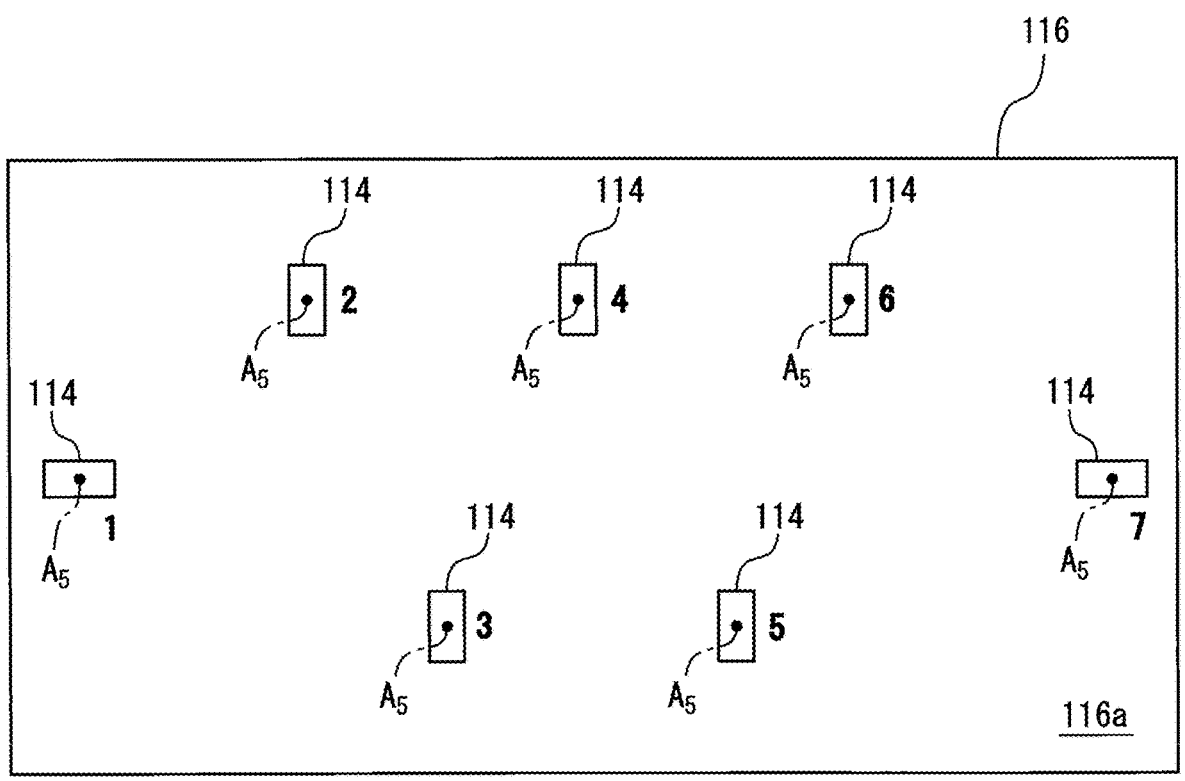
FIG. 20 illustrates an example of a member on which a counterpart connector is arranged.
Figure 21:
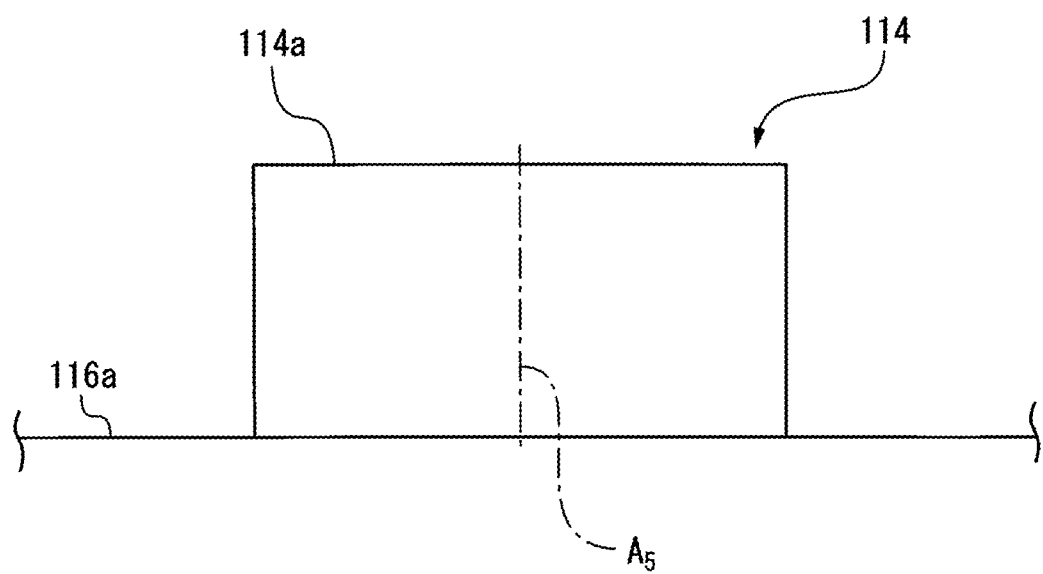
FIG. 21 illustrates an example of an arrangement state of the counterpart connector within the member.

When it is determined YES in step S5, in step S11, the controller 12 acquires positions of counterpart connectors 114 to which the connectors 102 are to be connected respectively. As illustrated in FIGS. 20 and 21, the counterpart connectors 114 are arranged at predetermined positions on an attachment surface 116a of a member 116.

In this embodiment, each of the counterpart connectors 114 has a central axis $A_5$, and is arranged on the attachment surface 116a in an orientation illustrated in FIG. 21. In the one example illustrated in FIG. 21, the connection section 114a of the counterpart connector 114, to which the connector 102 is connected, is oriented so as to face opposite the attachment surface 116a.

In this step S11, the controller 12 operates the robot 14 so as to move the vision sensor 15 (i.e., the robot hand 50) such that each counterpart connector 114 is within the field of view of the vision sensor 15.

Then, the controller 12 transmits an imaging command to the vision sensor 15. Upon receipt of the imaging command, the vision sensor 15 images the counterpart connectors 114, and analyzes the captured image so as to identify the counterpart connectors 114. Then, the vision sensor 15 acquires positional information of the identified counterpart connectors 114 (e.g., positional information of the axes $A_5$) in the robot coordinate system $C_R$, and transmits the positional information to the controller 12. In this way, the controller 12 acquires from the vision sensor 15 the positions of the counterpart connectors 114 that are to be connection targets, and stores them in the memory.

Note that, if the positions of the counterpart connectors 114 in the robot coordinate system $C_R$ is known because the member 116 is positioned at a known position using a jig for example, the controller 12 does not need to image the wire harness 100 by the vision sensor 15.

In this case, the positional information of each counterpart connector 114 in the robot coordinate system $C_R$ is pre-stored in the memory of the controller 12. In this step S11, the controller 12 reads out from the memory and acquires the positional information of each counterpart connector 114 that is to be the connection target.

In step S12, the controller 12 determines an order of connecting the connectors 102 being gripped by the robot hand 50 to the counterpart connectors 114. In this embodiment, the controller 12 determines the order of connection such that the connectors 102 are connected to the counterpart connectors 114 one by one in a to the order of picking up the seven connectors 102 by the seven grippers 80 in step S4.

For example, the controller 12 determines the order of connecting the connectors 102 to the counterpart connectors 114 as indicated by the numbers 1 to 7 in FIG. 20, and connects the connectors 102 to the counterpart connectors 114 in the order of the connector numbers 8→6→5→4→3→2→1 indicated in FIG. 13, each time step S15 described later is carried out.

In step S13, the controller 12 acquires gripping deviation when each gripper 80 grips the connector 102. Specifically, the controller 12 operates the robot 14 so as to move the robot hand 50 such that the connectors 102 gripped by the grippers 80 are within a field of view of the second vision sensor 112.

Then, the controller 12 transmits an imaging command to the second vision sensor 112. When receiving the imaging command, the second vision sensor 112 images the connectors 102 gripped by the grippers 80. At this time, the second vision sensor 112 may image the seven connectors 102 gripped by the seven grippers 80 at the same time.

Alternatively, the second vision sensor 112 may image the connectors 102 gripped by the grippers 80 one by one. In this case, the controller 12 may move the robot hand 50 in order relative to the second vision sensor 112 such that the respective connectors 102 are in the field of view of the second vision sensor 112 one by one, and each time one connector 102 is in the field of view of the second vision sensor 112, the second vision sensor 112 may image the one connector 102.

The second vision sensor 112 transmits the captured image to the controller 12. The controller 12 acquires, as a detected position, the position of the connector 102 gripped by the gripper 80 with respect to the gripper 80, from the image acquired from the second vision sensor 112. Then, the controller 12 acquires, as the gripping deviation, a gap between the acquired detected position and a reference position pre-stored in the memory.

The reference position is predetermined as the position of the connector 102 with respect to the gripper 80 when the gripper 80 grips the connector 102 in a state where the axis $A_3$ of the grip mechanism 56 coincides with the axis $A_{10}$ of the connector 102, for example. In this case, the gripping deviation corresponds to a gap between the axis $A_3$ of the grip mechanism 56 and the axis $A_{10}$ of the connector 102 gripped by the gripper 80.

In this step S13, the controller 12 operates the robot 14 in accordance with a robot program so as to position the robot hand 50 in a predetermined positional relation with respect to the second vision sensor 112. The robot program may be constructed by teaching the robot 14 an operation of positioning the robot hand 50 in the predetermined positional relation with respect to the second vision sensor 112.

As illustrated in FIG. 18, the controller 12 carries out a loop of steps S14 to S17 until it determines YES in step S16 described later. In step S14, the controller 12 positions the robot hand 50 relative to the counterpart connector 114. Specifically, the controller 12 operates the robot 14 based on the positional relation of the gripping position (axis $A_3$) of the grip mechanism 56 arranged at the actuation position B and on the positional information of the counterpart connectors 114, that are the connection targets, acquired in step S11, and positions the robot hand 50 such that the counterpart connector 114 that is the connection target is within the motion range of the gripper 80 of the grip mechanism 56 arranged at the actuation position B at the start of step S14.

At this time, the controller 12 positions the gripper 80 relative to the counterpart connector 114 such that the axis $A_3$ of the grip mechanism 56 arranged at the actuation position B coincides with the axis $A_5$ of the counterpart connector 114 that is the connection target.

For example, when step S14 is executed for the first time (1$^{st}$ step S14), the gripper 80 of the grip mechanism 56 arranged at the actuation position B at the start of this 1$^{st}$ step S14 is the one gripping the connector 102 denoted by the number "8" in FIG. 13, that has been picked up in the 8$^{th}$ step S4. Therefore, in this 1$^{st}$ step S14, the robot hand 50 is positioned such that the axis $A_3$ of the grip mechanism 56 gripping the connector 102 of number "8" coincides with the axis $A_5$ of the counterpart connector 114 denoted by number "1" in FIG. 20 that is the 1$^{st}$ connection target.

Then, the controller 12 operates the robot 14 so as to move the robot hand 50 based on the gripping deviation acquired in step S13, and corrects the position of the gripper 80 of the grip mechanism 56 arranged at the actuation position B with respect to the connection target counterpart connector 114. As a result, the axis $A_{10}$ of the connector 102 gripped by the gripper 80 coincides with the axis $A_5$ of the connection target counterpart connector 114.

In this way, the connection target counterpart connector 114 is arranged on the movement path of the connector 102 gripped by the gripper 80 of the grip mechanism 56 arranged at the actuation position B when this gripper 80 is advanced.

In step S15, the controller 12 connects the connector 102 to the counterpart connector 114. Specifically, the controller 12 operates the gripper driving section 60 so as to move the gripper 80 of the grip mechanism 56 arranged at the actuation position B from the retracted position to the advanced position. As a result, the connector 102 gripped by the gripper 80 is connected to the connection section 114a of the connection target counterpart connector 114 in the connection direction F.

Then, the controller 12 operates the gripper driving mechanism 82 so as to move the claws 84 in the direction away from the axis $A_3$ to open the claws 84, and whereby releases the gripped connector 102 from the gripper 80. Then, the controller 12 operates the gripper driving section 60 so as to move the gripper 80 of the grip mechanism 56 arranged at the actuation position B from the advanced position to the retracted position.

If step S15 is executed for the first time (1$^{st}$ step S15) for example, the gripper 80 of the grip mechanism 56 arranged at the actuation position B at this time is the one gripping the connector 102 of number "8" in FIG. 13, therefore, the connector 102 of number "8" is connected to the counterpart connector 114 of number "1" in FIG. 20 in this 1$^{st}$ step S15.

In step S16, the controller 12 determines whether or not all the connectors 102 have been connected to the counterpart connectors 114 that are the connection targets. For example, the controller 12 counts the number "m" of execution of step S15, and determines whether or not the number "m" is 7. The controller 12 determines YES when the number "m" is 7, and ends the flow illustrated in FIG. 18. On the other hand, the controller 12 determines NO when the number "m" is 6 or less, and proceeds to step S17.

In step S17, the controller 12 moves the gripper driving section 60 and the plurality of grip mechanisms 56 (i.e., the force transmission members 70) relative to each other. Specifically, the controller 12 operates the second movement driving section 59 so as to move the gripper driving section 60 to the disengagement position (FIG. 6). Then, the controller 12 operates the first movement driving section 58 so as to rotate the second base 54 about the axis $A_2$ relative to the first base 52 in the opposite direction of the rotation direction in the above-described step S6.

If step S17 is executed for the first time (1$^{st}$ step S17) for example, the controller 12 rotates the second base 54 about the axis $A_2$ relative to the first base 52 by 90 degrees in the opposite direction. As a result, the grip mechanism 56 gripping the connector 102 denoted by number "6" in FIG. 13 is newly arranged at the actuation position B.

In this regards, the controller 12 may open the claws 84 of the gripper 80 gripping the wire member 104 at the position of the sign 106 so as to release the gripped wire member 104 from the gripper 80, before, during or after 1$^{st}$ step S17.

Further, if step S17 is executed for the q-th time (q$^{th}$ step S17. "q" is an integer from 2 to 6), the controller 12 rotates the second base 54 by 45 degrees about the axis $A_2$ in the opposite direction. As a result, other grip mechanism 56, that is next to the grip mechanism 56 arranged at the actuation position B at the start of q$^{th}$ step S17, is newly arranged at the actuation position B.

Then, the controller 12 moves the second movement driving section 59 so as to move the gripper driving section 60 to the engagement position. As a result, the gear 88 of the gripper driving section 60 engages the force transmission member 70 of the grip mechanism 56 newly arranged at the actuation position B.

Then, the controller 12 returns to step S14, and positions the gripper 80 of the grip mechanism 56 newly arranged at the actuation position B relative to the counterpart connector 114 that is next connection target, and then, connects the connector 102 gripped by the gripper 80 to the next connection target counterpart connector 114 in step S15.

As described above, the controller 12 repeatedly carries out steps S14 to S17 until it determines YES in step S16 to connect the connectors 102 to the counterpart connectors 114 one by one, in a reverse order to the order of gripping the seven connectors 102 by the grippers 80 in step S4.

In this embodiment, the connectors 102 picked up by the plurality of grippers 80 configured to advance and retract independently from each other are connected to the counterpart connectors 114 one by one, by advancing and retreating of the plurality of grippers 80 respectively. According to this configuration, a task of transporting the wire harness 100 with the plurality of connectors 102 and connecting the plurality of connectors 102 to the counterpart connectors 114 can be automated.

In addition, in this embodiment, since the grippers 80 are advanced and retracted one by one in order to connect the connectors 102 to the counterpart connectors 114, it is possible to connect the connectors 102 to the counterpart connectors 114 without entanglement of the wire member 104 because of the connection operation of connectors 102.

Further, in this embodiment, the connectors 102 are connected to the counterpart connectors 114 one by one in the reverse order to the order of gripping the connectors 102. According to this configuration, since the wire member 104 is raveled from their bottom side each time the connection of connectors 102 is carried out, it is possible to effectively prevent the entanglement of the wire member 104 upon the connection.

Figure 22:
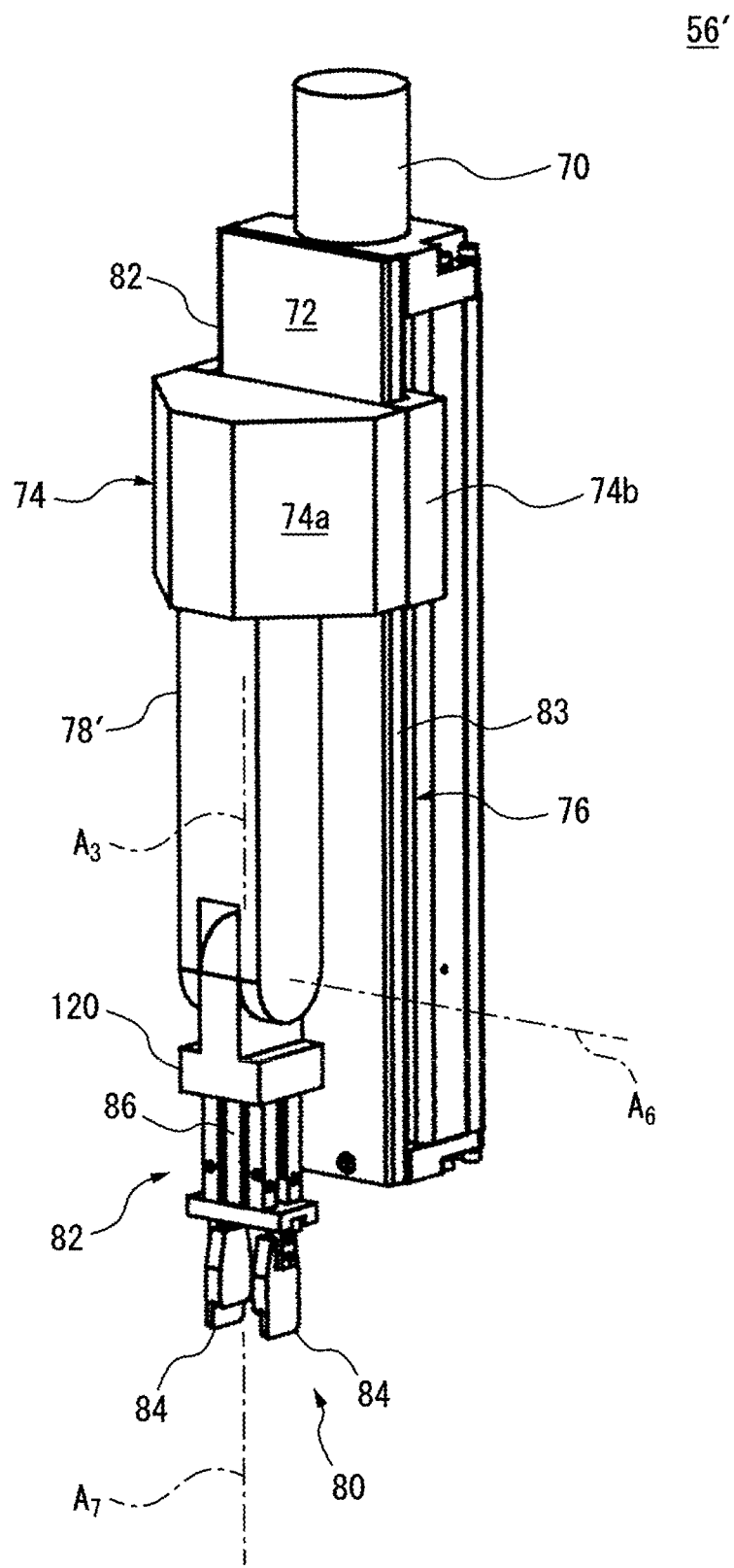
FIG. 22 illustrates a grip mechanism according to another embodiment that is in a state in which the grip is arranged at the initial position.
Figure 23:
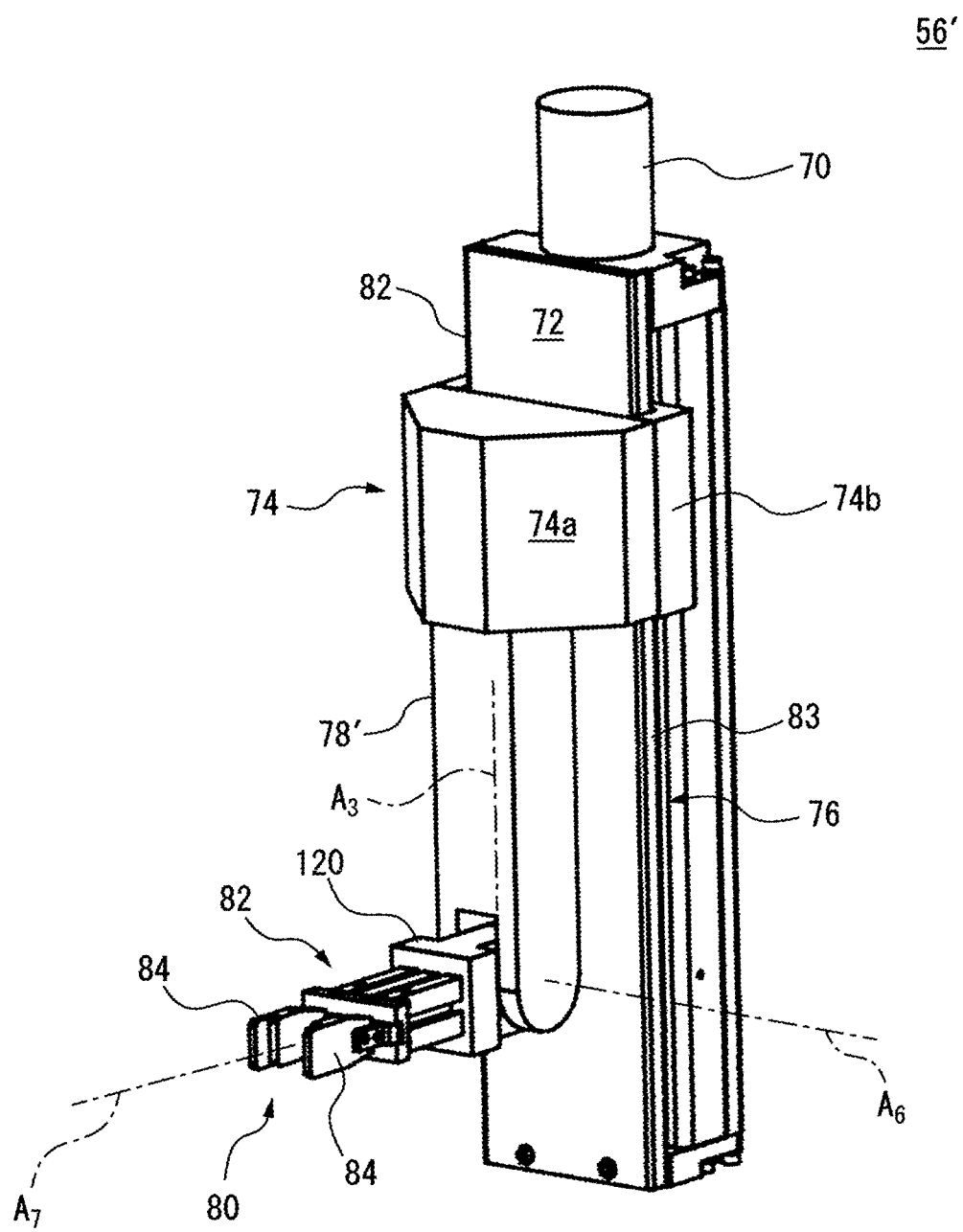
FIG. 23 illustrates a state in which the grip of the grip mechanism illustrated in FIG. 22 is arranged at a rotation position.

It should be noted that various modifications may be made to the above-described grip mechanism 56. Hereinafter, the modifications of the grip mechanism 56 are described with reference to FIGS. 22 and 26. A grip mechanism 56' illustrated in FIGS. 22 and 23 differs from the above-described grip mechanism 56 in the following configuration. Specifically, in the grip mechanism 56', the gripper 80 is provided at the distal end of a cylinder housing 78' so as to be rotatable about the axis $A_6$.

More specifically, the grip mechanism 56' further includes a rotary member 120 provided at the distal end of the cylinder housing 78' so as to be rotatable about the axis $A_6$, and a rotation driver (not illustrated) configured to rotate the rotary member 120, wherein the gripper driving mechanism 82 and the gripper 80 are fixed to the rotary member 120. The axis $A_6$ is orthogonal to the axis $A_3$ of the cylinder housing 78'. The rotation driver rotates the rotary member 120 in response to a command from the controller 12, whereby rotating the gripper 80 between an initial position illustrated in FIG. 22 and a rotated position illustrated in FIG. 23.

On the other hand, the claws 84 of the gripper 80 is moved toward and away from an axis $A_7$. The axis $A_7$ rotates about the axis $A_6$, and coincides with the axis $A_3$ when the gripper 80 is arranged at the initial position, while is orthogonal to the axis $A_3$ when the gripper 80 is arranged at the rotated position.

Figure 24:
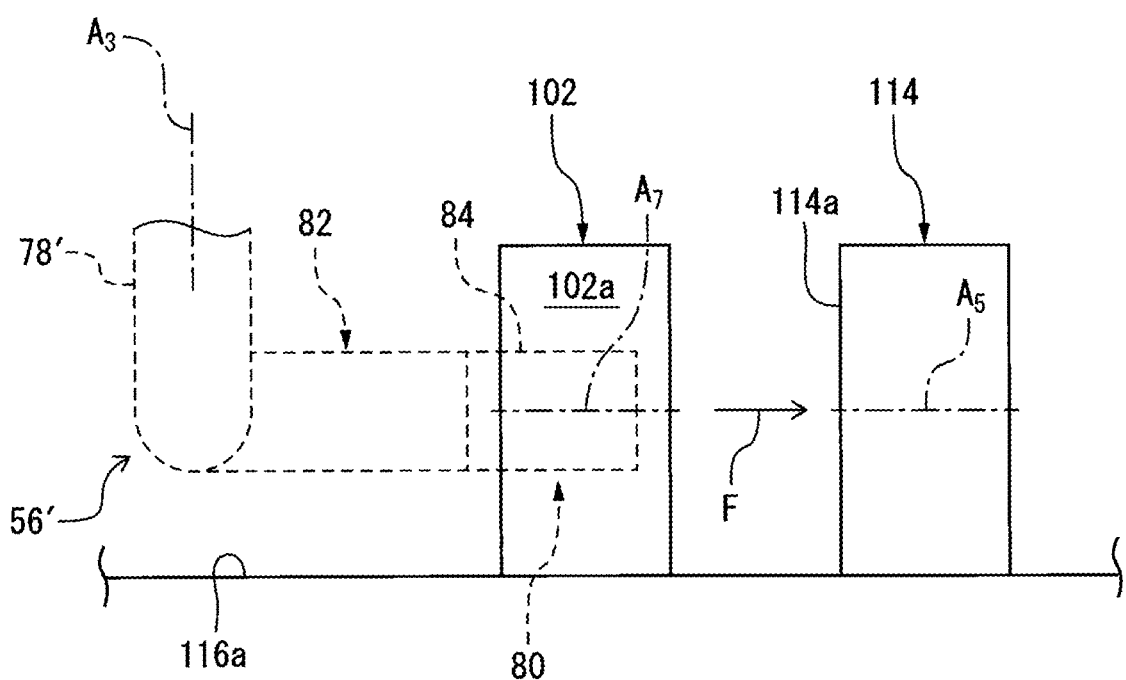
FIG. 24 is a drawing for describing a method for connecting a connector gripped by the grip mechanism illustrated in FIG. 22 to a counterpart connector.

According to the grip mechanism 56' of this embodiment, the connectors 102 picked up in the above-described step S4 can be connected to the counterpart connectors 114 even when the counterpart connector 114 are mounted on an attachment surface 116*a* as illustrated in FIG. 24, for example.

More specifically, information of the positional relation of the axis $A_7$ to the axis $A_3$ when the gripper 80 is arranged at the rotated position (FIG. 23) is pre-stored in the memory of the controller 12. In step S14 illustrated in FIG. 18, the controller 12 firstly operates the rotation driver so as to arrange the gripper 80 at the rotated position, and then, operates the gripper driving section 60 so as to move the gripper 80 of the grip mechanism 56 arranged at the actuation position B from the retracted position to the advanced position.

Then, the controller 12 operates the robot 14 based on the positional information of the axis $A_3$ of the grip mechanism 56 arranged at the actuation position B, on the positional information of the connection-target counterpart connectors acquired in step S11, and on the positional relation of the axis $A_7$ to the axis $A_3$, and positions the robot hand 50 such that the axis $A_7$ of the gripper 80 coincides with the axis $A_5$ of the counterpart connector 114 as illustrated in FIG. 24.

At this time, the connector 102 gripped by the gripper 80 is arranged separate away from the connection section 114*a* of the counterpart connector 114 in a direction opposite to the insertion direction F. Then, in step S15, the controller 12 operates the robot 14 so as to move the gripper 80 in the insertion direction F, and connects the connector 102 gripped by the gripper 80 to the connection section 114*a* of the counterpart connector 114 in the insertion direction F.

Figure 25:
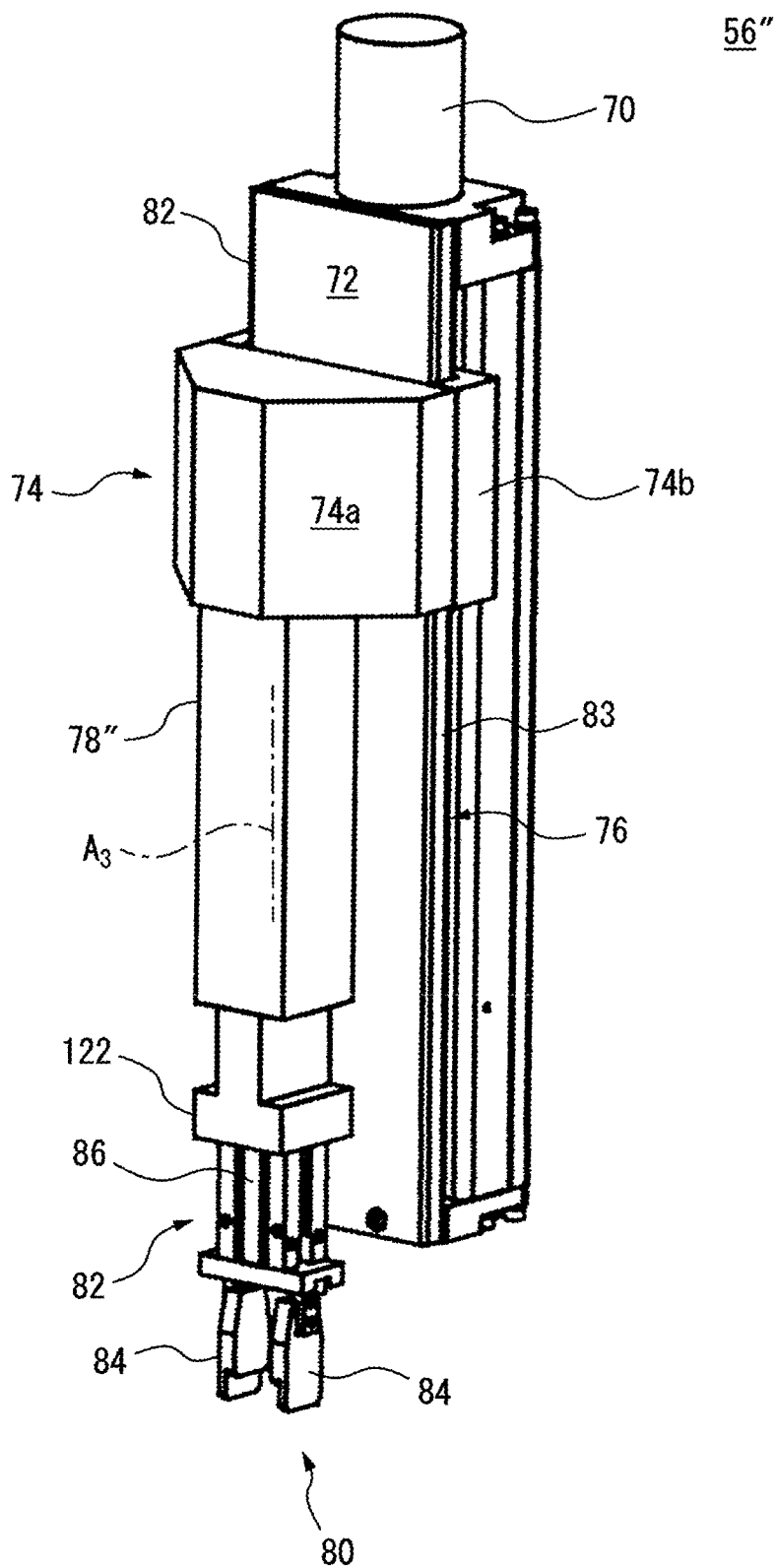
FIG. 25 illustrates a grip mechanism according to yet another embodiment in which the grip is arranged at the initial position.
Figure 26:
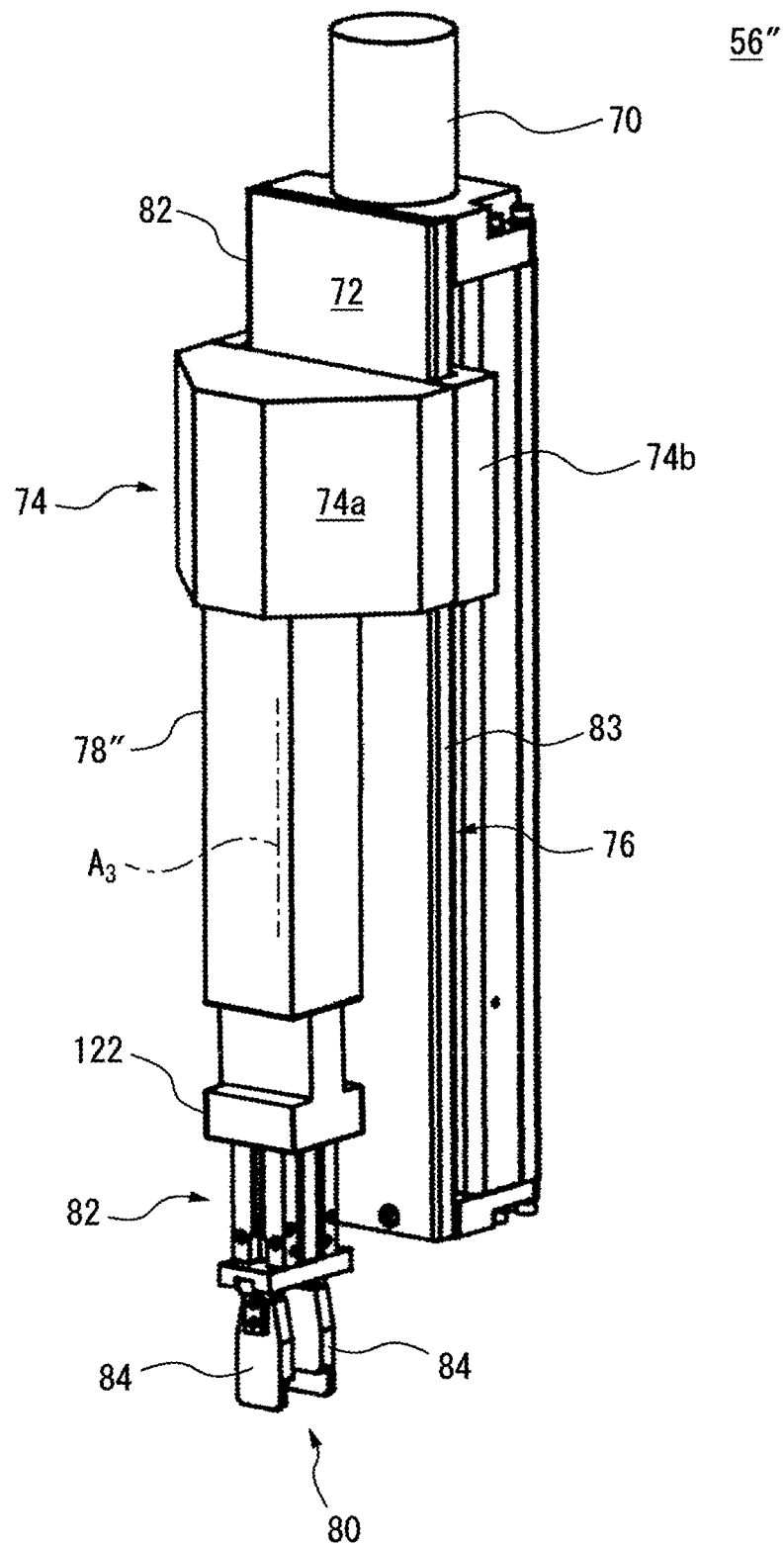
FIG. 26 illustrates a state in which the grip of the grip mechanism illustrated in FIG. 25 is rotated.

A grip mechanism 56" illustrated in FIGS. 25 and 26 differs from the above-described grip mechanism 56 in the following configuration. Specifically, in the grip mechanism 56", the gripper 80 is provided at the distal end of a cylinder housing 78' so as to be rotatable about the axis $A_3$.

The grip mechanism 56" further includes a rotary member 122 provided at the distal end of the cylinder housing 78" so as to be rotatable about the axis $A_3$, and a second rotation driver (not illustrated) configured to rotate the rotary member 122, wherein the gripper driving mechanism 82 and the gripper 80 are fixed to the rotary member 122. The second rotation driver rotates the rotary member 122 in response to a command from the controller 12, and rotates the gripper 80 about the axis $A_3$.

According to the above-mentioned grip mechanisms 56' and 56", it is possible to effectively carry out connecting the connectors 102 to the counterpart connectors 114 while flexibly responding to the direction of the connector 102 gripped by the gripper 80 or of the mounted counterpart connector 114.

It should be noted that the order 1 to 8 illustrated in FIG. 13 and the order 1 to 7 illustrated in FIG. 20 are not limited as illustrated, but may be determined as desired. For example, the sign 106 may be determined as the first, fourth, or eighth grip target. Moreover, an arbitrary position of the wire member 104 may be gripped by the gripper 80 without providing the sign 106.

The wire harness 100 may include the number of "a" of the connectors 102, and the number of "b" of counterpart connectors 114 may be provided in the member 116 ("a" and "b" are integers that are equal to or greater than 2 and not 7). The connectors 102 and the counterpart connectors 114 may have any outer shapes not rectangle, such as circular, oval, or polygonal (e.g., hexagonal). The gripper 80 may include an attracting portion such as a vacuum or an electromagnet, and may be configured to attract to hold the connector 102.

The gripper driving section 60 is not limited to a servomotor, but may be e.g. a pneumatic or hydraulic cylinder. The plurality of grip mechanisms 56 may be linearly arranged. The plurality of grip mechanisms 56 may be fixed relative to the first base 52, and the gripper driving section 60 may be moved so as to selectively engage the respective grip mechanisms 56.

Figure 27:
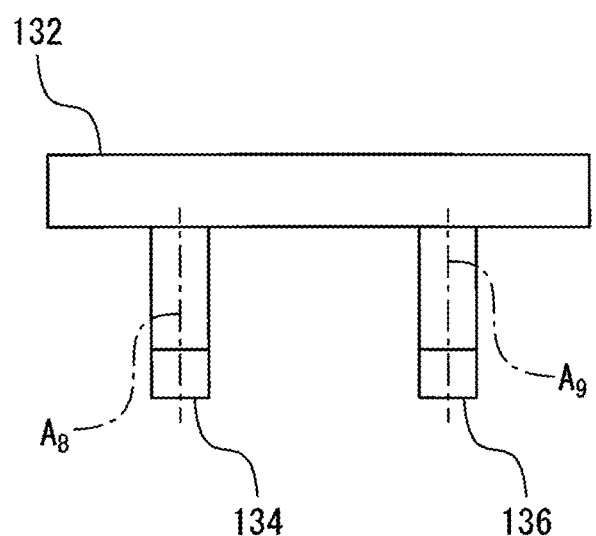
FIG. 27 illustrates a robot hand according to another embodiment.

The method of handling the wire harness 100 may be carried out using a robot hand different from the robot hand 50 illustrated in FIG. 3. An example of such a robot hand is illustrated in FIG. 27. A robot hand 130 illustrated in FIG. 27 includes a base 132, and a first gripper 134 and a second gripper 136 provided at the base 132 so as to be moveable independently from each other.

Each of the first gripper 134 and the second gripper 136 may include claws 84 able to open and close, similar to the above-mentioned gripper 80, or may include an attraction portion such as a vacuum or an electromagnet. The first gripper 134 can advance and retract along the axis $A_8$, and the second gripper 136 can advance and retract along the axis $A_9$. The axis $A_8$ and the axis $A_9$ may be parallel. The base 132 of the robot hand 130 may be attached to the wrist 22 of the above-described robot 14.

The method of handling the wire harness 100 using such a robot hand 130, includes acquiring the positions of the plurality of connectors 102 of the wire harness 100 arranged apart from the robot hand 130 (step S1); based on the acquired position of the first connector 102, positioning the robot hand 130 such that the first connector 102 is within the motion range of the first gripper 134 (step S3), moving the first gripper 134, gripping and picking up the first connector 102 by the first gripper 134 (step S4); and based on the acquired position of the second connector 102, positioning the robot hand such that the second connector 102 is within the motion range of the second gripper 136 (step S3), moving the second gripper 136, gripping and picking up the second connector 102 by the second gripper 136 (step S4).

Hereinabove, the present disclosure has been described with the embodiments, however, the above-described embodiments are not intended to limit the invention according to the claims.

The invention claimed is:

1. A method of handling a wire harness including a plurality of connectors and a wire member, using a robot hand including a plurality of grippers configured to move independently from each other, the method comprising:

acquiring positions of the plurality of connectors of the wire harness arranged apart from the robot hand;

based on the acquired position of a first connector of the plurality of connectors, positioning the robot hand such that the first connector is within a motion range of a first gripper of the plurality of grippers, and moving the first gripper to grip and pick up the first connector by the first gripper; and based on the acquired position of a second connector of the plurality of connectors, positioning the robot hand such that the second connector is within a motion range of a second gripper of the plurality of grippers, and moving the second gripper to grip and pick up the second connector by the second gripper.

2. The method according to claim 1, further comprising:

acquiring a position of the wire member of the wire harness arranged apart from the robot hand; and before picking-up operation by the first gripper, after picking-up operation by the second gripper, or between the picking-up operation by the first gripper and the picking-up operation by the second gripper, positioning the robot hand such that the wire member is within a motion range of a third gripper of the plurality of grippers and moving the third gripper to grip and pick up the wire member by the third gripper, based on the acquired position of the wire member.

3. The method according to claim 2, further comprising:

providing a sign to the wire member;

imaging the sign by a vision sensor and acquiring a position of the sign; and based on the acquired position of the sign, gripping and picking up the wire member by the third gripper at the position of the sign.

4. The method according to claim 1, further comprising moving the robot hand to transport the wire harness, after picking-up operation by the first gripper and picking-up operation by the second gripper.

5. The method according to claim 1, further comprising:

acquiring positions of a plurality of counterpart connectors to which the plurality of connectors are connected respectively;

based on the acquired position of a first counterpart connector of the plurality of counterpart connectors, positioning the robot hand such that the first counterpart connector is within the motion range of the first gripper gripping the first connector, and moving the first gripper so as to connect the first connector to the first counterpart connector; and based on the acquired position of a second counterpart connector the plurality of counterpart connectors, positioning the robot hand such that the second counterpart connector is within the motion range of the second gripper gripping the second connector, and moving the second gripper so as to connect the second connector to the second counterpart connector.

* * * * *